United States Patent
Zane et al.

(10) Patent No.: US 7,337,351 B2
(45) Date of Patent: Feb. 26, 2008

(54) DISK MIRROR ARCHITECTURE FOR DATABASE APPLIANCE WITH LOCALLY BALANCED REGENERATION

(75) Inventors: Barry M. Zane, Wayland, MA (US); Foster D. Hinshaw, Somerville, MA (US); Philip J. MacDonald, Waltham, MA (US); John K. Metzger, Westborough, MA (US)

(73) Assignee: Netezza Corporation, Framingham, MA (US)

( * ) Notice: Subject to any disclaimer, the term of this patent is extended or adjusted under 35 U.S.C. 154(b) by 581 days.

(21) Appl. No.: 10/885,519

(22) Filed: Jul. 6, 2004

(65) Prior Publication Data

US 2005/0022051 A1 Jan. 27, 2005

Related U.S. Application Data

(63) Continuation-in-part of application No. 10/667,127, filed on Sep. 18, 2003, now Pat. No. 7,089,448.

(60) Provisional application No. 60/411,743, filed on Sep. 18, 2002.

(51) Int. Cl.
*G06F 11/00* (2006.01)
(52) U.S. Cl. .......................................................... 714/6
(58) Field of Classification Search .................. None
See application file for complete search history.

(56) References Cited

U.S. PATENT DOCUMENTS

| | | | |
|---|---|---|---|
| 4,077,059 A | 2/1978 | Cordi et al. |
| 4,558,413 A | 12/1985 | Schmidt et al. |
| 4,631,673 A | 12/1986 | Haas et al. |
| 4,635,189 A | 1/1987 | Kendall |
| 4,646,229 A | 2/1987 | Boyle |
| 4,648,036 A | 3/1987 | Gallant |
| 4,714,992 A | 12/1987 | Gladney et al. |
| 4,853,843 A | 8/1989 | Ecklund et al. |
| 4,875,159 A | 10/1989 | Carey et al. |
| 5,737,601 A | 4/1998 | Jain et al. |
| 5,764,903 A | 6/1998 | Yu |
| 5,828,820 A | 10/1998 | Onishi et al. |
| 6,023,584 A | 2/2000 | Barton et al. |
| 6,167,531 A | 12/2000 | Sliwinski |
| 6,298,425 B1 | 10/2001 | Whitaker et al. |
| 6,389,459 B1 | 5/2002 | McDowell |

(Continued)

FOREIGN PATENT DOCUMENTS

EP 0 541 992 A2 5/1993

(Continued)

*Primary Examiner*—Yolanda L Wilson
(74) *Attorney, Agent, or Firm*—Hamilton, Brook, Smith & Reynolds, P.C.

(57) ABSTRACT

A disk is segmented into a first data segment and a secondary data segment. The secondary data segment stores a logical mirror of the first data segment of another disk. Upon detecting a failure, the logical mirror of data stored in the first data segment of the failed disk is accessible from the secondary data segment of a non-failed disk. The first data segment can be rebuilt quickly on another disk from the logical mirror stored in the secondary data segment. During regenerating, accesses to the first data segment on the disk containing the logical mirror are handled by its own logical mirror, which is not involved in the regenerating process.

16 Claims, 16 Drawing Sheets

U.S. PATENT DOCUMENTS

| | | |
|---|---|---|
| 6,405,284 B1 | 6/2002 | Bridge |
| 6,530,035 B1 * | 3/2003 | Bridge .................. 714/6 |
| 6,606,694 B2 | 8/2003 | Carteau |
| 6,654,862 B2 * | 11/2003 | Morris .................. 711/162 |
| 6,694,406 B2 | 2/2004 | Kodama et al. |
| 6,792,486 B1 | 9/2004 | Hanan et al. |
| 6,801,914 B2 | 10/2004 | Barga et al. |
| 6,801,921 B2 | 10/2004 | Tsuchida et al. |
| 6,880,101 B2 * | 4/2005 | Golasky et al. .................. 714/4 |
| 2003/0237019 A1 | 12/2003 | Kleiman et al. |
| 2004/0128442 A1 | 7/2004 | Hinshaw et al. |
| 2005/0034013 A1 * | 2/2005 | Yamamoto et al. ............. 714/6 |
| 2007/0016727 A1 * | 1/2007 | Peters et al. ................. 711/114 |

FOREIGN PATENT DOCUMENTS

| | | |
|---|---|---|
| EP | 0 784 273 A2 | 7/1997 |

\* cited by examiner

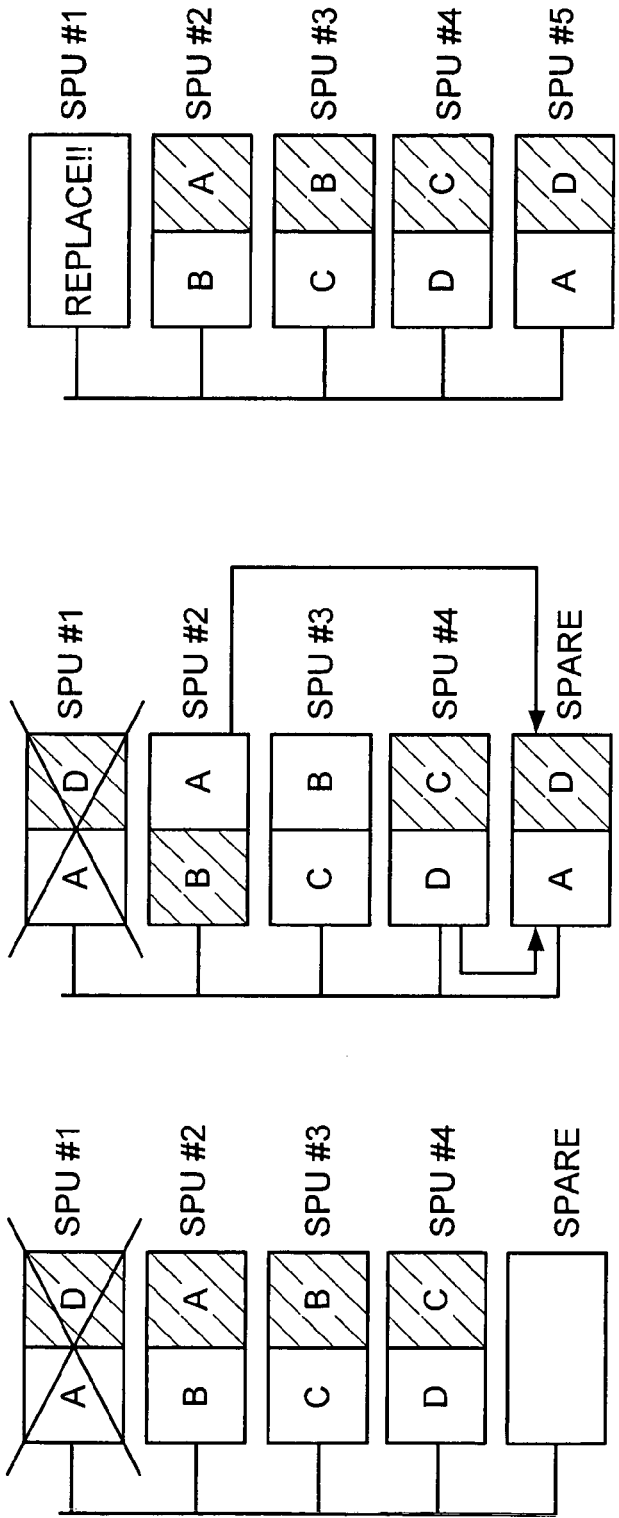

DISK MIRROR ARCHITECTURE FOR DATABASE APPLIANCE WITH LOCALLY BALANCED REGENERATION

RELATED APPLICATION(S)

This application is a continuation-in-part of U.S. application Ser. No. 10/667,127, filed on Sep. 18, 2003 now U.S. Pat. No. 7,089,448, which claims the benefit of U.S. Provisional Application No. 60/411,743, filed on Sep. 18, 2002. The entire teachings of the above-applications are incorporated herein.

BACKGROUND OF THE INVENTION

A Redundant Array of Inexpensive Disks (RAID) provides highly available data by distributing data amongst a plurality of disks using a method defined by one of a plurality of RAID levels. In a system implementing RAID level 1, each disk in the system has an associated mirror disk, all data written to the primary disk being replicated on the mirror disk.

SUMMARY OF THE INVENTION

RAID systems typically have a single hardware controller controlling which data goes to which disks. The topology of the disk mirroring is pre-set and, in case of a fault, a replacement disk needs to be connected in order to provide the same level of fault-tolerance. In case of a RAID controller failure, the whole system may be inaccessible while the controller is being replaced. There is a need for a system that adaptively modifies the mirroring topology and can recover from the faults autonomously and transparently to a host computer.

The RAID systems typically configure mirroring architecture without considering the arrangement of the data on the drive. Data is read from and written to the disk at a constant bit rate. However, the tracks of a disk are not all the same size. Inner tracks can be a few inches smaller than outer tracks. If one rotation of the disk takes N seconds, more data is read from or written to the longer track per second than from or to the shorter track. Thus, the data transfer time differs dependent on the physical location of the data on the disk. Thus placing the mirror segments on the shorter tracks, according to one embodiment of the present invention, may increase the general speed of the system.

A method and apparatus are provided for mirroring data. The disk mirror apparatus includes a plurality of processing assemblies, each consisting of one or more disks and a processing unit. Each disk has at least two data segments, a first data segment and one or more secondary data segments, and may have one or more system segments. Each processing unit is coupled to one or more of the plurality of disks. A processing unit may consist of a general-purpose processor, a memory, a network interface and a disk controller.

A processing unit that receives a request to write data to a first disk writes the data to the first data segment of the first disk and forwards the data to another processing unit. The data set on the first disk is referred to as the primary data segment or the primary data slice. The other processing unit writes a copy of the data to a secondary data segment of a second disk coupled to the other processing unit. The data set copied to the second disk is referred to as the mirror data set or the mirror data slice. The disk storing the primary data set in its first segment is referred to as the primary disk for that set, and the disk storing the mirror data set in its secondary segment is referred to as the mirror disk for that set. The secondary data segment corresponding to the first data segment is a logical mirror of the first data segment.

During a fail-over, a disk may be reconstructed by copying data segments for the first and second data segments from the corresponding logical mirrors of the first and second data segment. During the reconstruction, requests for data access to the first data segment on the logical mirror of the first data segment from the failed disk may be handled by a corresponding logical mirror of that first data segment.

Rerouting of data access requests may be accomplished by the system manager. In an alternative embodiment of the invention, rerouting of the requests may be accomplished by individual storage processing units, which may be enabled to perform re-routing autonomously from the mirror manager and from the host computer.

If a modification to data is requested, such modification may be made to the logical mirror of the non-reconstruction participating segment and later mirrored in the primary segment to which the logical mirror corresponds. In an alternative embodiment of the invention, data modification requests may be simultaneously received by the non-reconstruction participating segments and their logical mirrors, while the logical mirrors may still be solely responsible for responding to data accesses that do not involve data modification.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 16 and 17 illustrate regeneration of the first data segment of the failed SPU on a spare SPU while handling requests to the primary data segment of the mirror SPU by its mirror SPU.

DETAILED DESCRIPTION OF THE INVENTION

A description of preferred embodiments of the invention follows.

Figure 1:
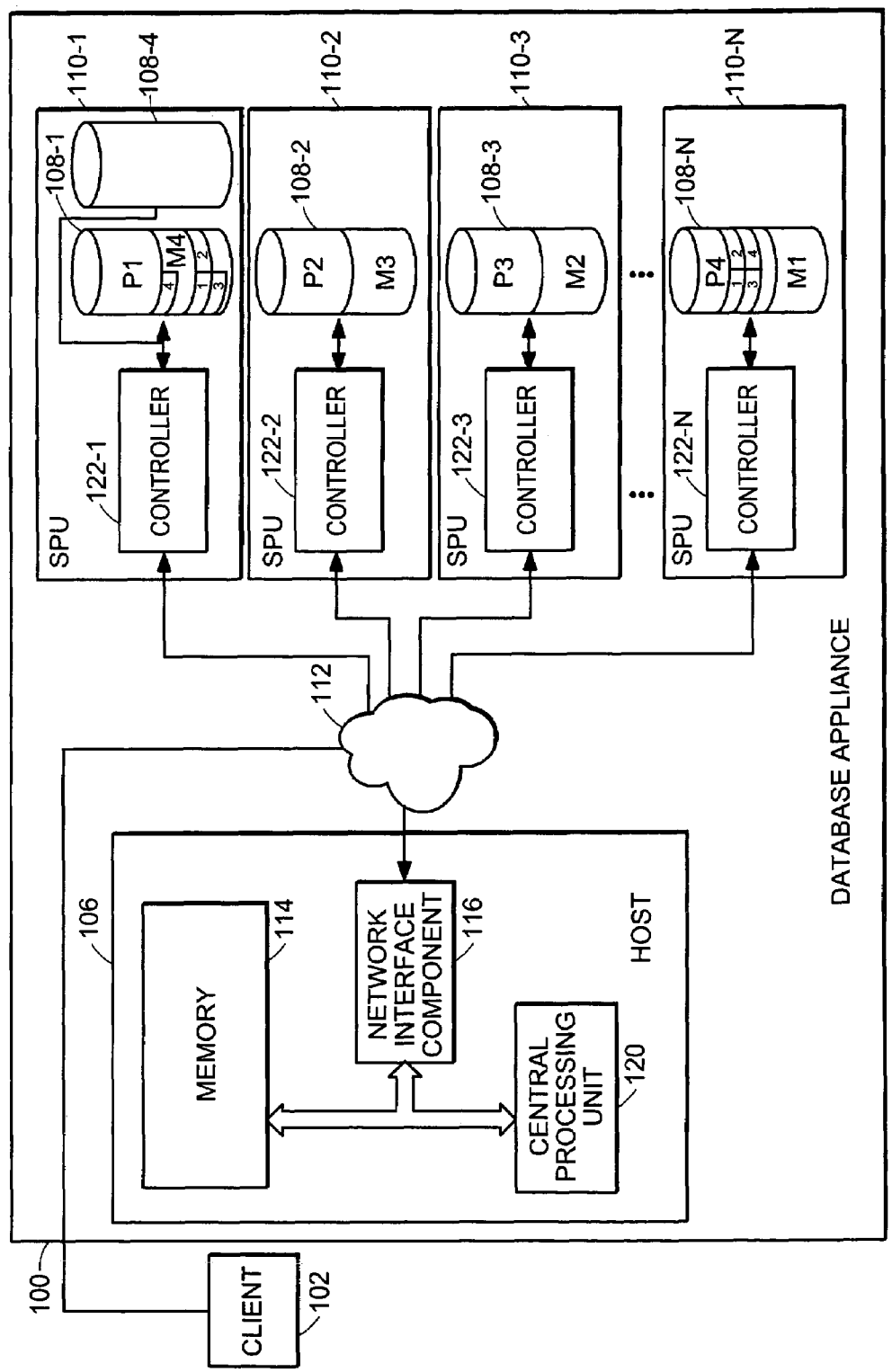
FIG. 1 is a block diagram of a database appliance according to the principles of the present invention.

FIG. 1 is a block diagram of a database appliance 100 according to the principles of the present invention. The database appliance 100 includes a host 106 for processing database requests received from a client 102 and a plurality of disk drives 108-1, . . . , 108-n storing the database. Each of the plurality of disk drives 108-1, . . . 108-n is coupled to a respective Controller 120-1, . . . 120-n. Each Snippet Processing Unit (SPU) 110-1, . . . 110-n forms a processing assembly that includes a respective controller 122-1, . . . 122-n and at least one disk drive. In the embodiment shown, controllers 122-2, 122-3 and 122-n are each coupled to one disk drive and controller 122-1 is coupled to two disk drives. Each SPU is coupled to a host 106 through a data communication network. 112. The SPU performs the primitive functions of a query to the database, controlling all aspects of reading from and writing to a disk.

The host 106 manages descriptions of tables for the database stored in the plurality of disk drives. Routines for managing and accessing records stored in the database are available to the host 114 and portions of the database can be copied from the disk drives and stored in host memory. The host receives database queries from the client 102 transmitted over a network 112. A network interface component 116 in the host receives the database queries. The network interface component 116 may be a network interface card, switch or router, Fibre Channel transceiver, InfiniBand-enabled device, or other device programmed to transmit and receive messages according to standardized data network protocols. A central processing unit (CPU) 120 in the host processes a received database query by forwarding pieces of the query through the network interface component 116 over the data communications network 112 to the SPU storing the requested record. The piece of the query forwarded to the SPU for processing is referred to as a "snippet". The snippet can include a set of database operations such as join, sort, aggregate, restrict, project, expression evaluation, statistical analysis or other operations. Database requests can be processed more efficiently by off-loading some of the processing from the host to the SPU.

Figure 2:
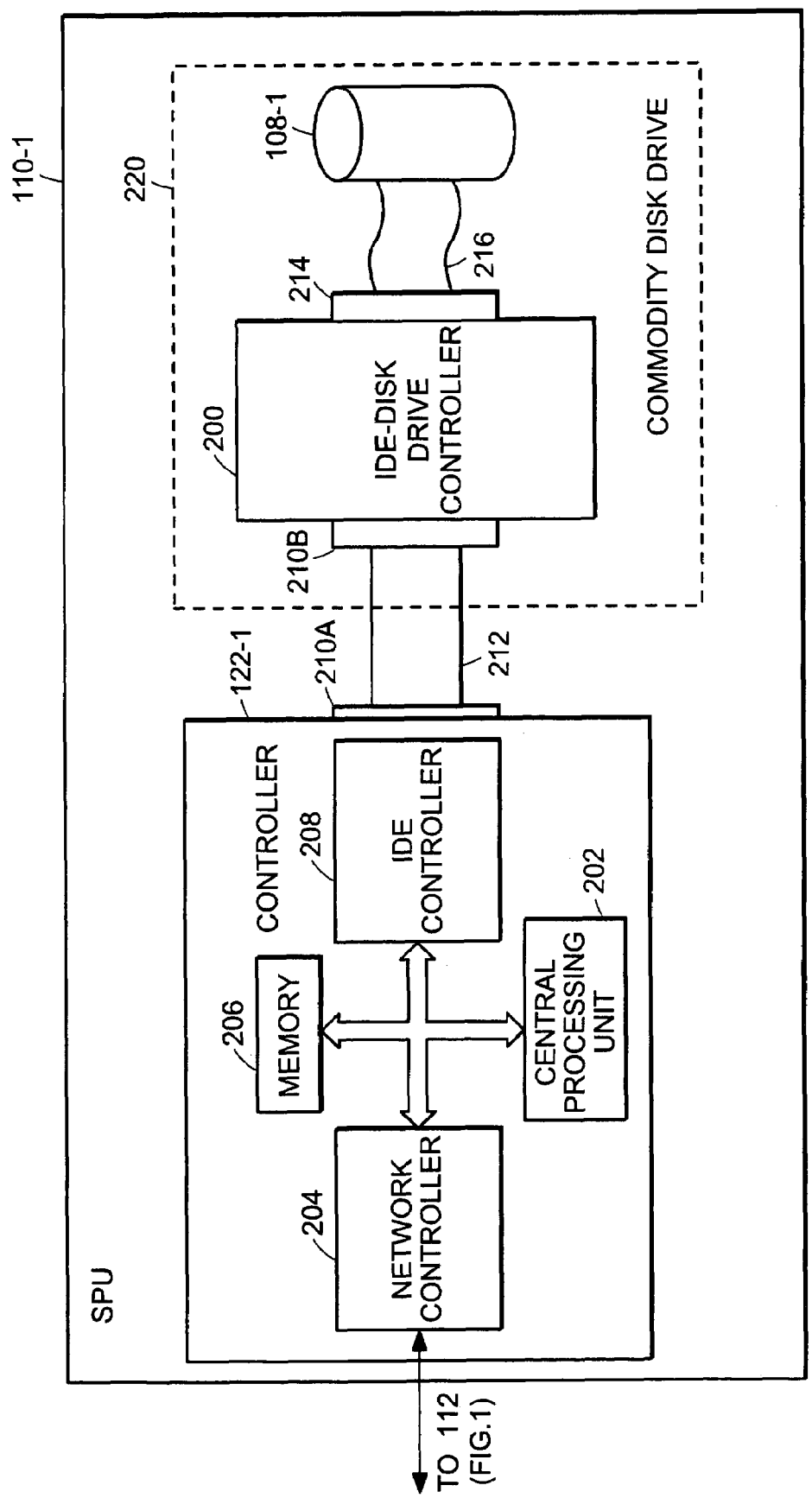
FIG. 2 is a block diagram of one of the Snippet Processing Units shown in FIG. 1.

FIG. 2 is a block diagram of one of the Snippet Processing Units 110-1 shown in FIG. 1. The controller 122-1 includes memory 206, a central processing unit 202, a network controller 204 coupled to the data communication network and an IDE controller 208 coupled to a disk drive controller 200. The controller 122-1 is coupled to the disk drive controller 200 through a disk controller interface. The disk controller interface includes a connector interface 212 that couples connector 210A on the controller to connector 210B on the disk drive controller 200. In one embodiment, the connector interface is the American National Standards Institute ("ANSI") AT Attachment interface (ATA), commonly referred to as the Integrated Drive Electronics ("IDE") interface. Although this description may only refer to ATA interfaces and connectors throughout, it is understood that such connectors can be IDE, Small Computer Systems Interface ("SCSI"), Serial ATA, Fibre Channel Arbitrated Loop (FC-AL) (optical), or any other Hard Disk Drive ("HDD") connector. Possible embodiments of the connector interface include a printed circuit board or a cable.

A conventional disk drive 108 includes a plurality of cylinders, heads, and sectors. A physical sector on the disk is specified by a cylinder, head, and sector (CHS) address. The head specifies a track within the cylinder of tracks. The sector specifies the location of a physical sector of data within the specified track. The disk drive 220 maps Logical Block Addresses (LBAs) to physical blocks or sectors on the disk. LBAs comprise an abstraction layer above the physical disk. The disk controller 208 in the SPU 110-1 forwards an LBA to the disk drive controller 200 in the disk drive 220. The disk drive controller 200 translates the LBA to a physical cylinder, head, and sector address to locate the corresponding physical sector on the disk.

The disk drive controller 200 may automatically remap an LBA to a new physical cylinder, head and sector address should the original physical sector become unreadable. The disk drive controller 200 may maintain a list of spare sectors for this purpose. When the disk controller 200 encounters an error reading a designated sector, it remembers that LBA, indicating that it should be remapped. When a subsequent attempt to write data to that LBA is received, the disk drive controller automatically remaps the LBA to a spare sector. This capability is exploited by the invention to implement a micro-mirroring capability, in which the data that existed in a physical sector that has become unreadable is retrieved from a mirrored copy and rewritten to the same LBA, relying on the disk controller 200 to remap the LBA to a spare sector.

Returning to FIG. 1, each disk 108 is "partitioned" into at least two segments, a first data segment P and a secondary data segment M. In one embodiment, typical hard drive partitions are used for the segments. A partition is typically defined in terms of a start LBA and a length in sectors. In one embodiment, a partition is a logically contiguous, but not necessarily physically contiguous, portion of a disk. A partition is not aligned to cylinder/head boundaries. In one embodiment, low numbered LBAs may be located on the outer tracks of a disk and the LBA numbers increase towards the inner tracks.

The invention provides an additional layer of abstraction, which maps database table-relative logical blocks to LBAs. In one embodiment, a logical block corresponds to 256 disk blocks. This additional layer of abstraction allows logical blocks to be moved to new disk locations—to facilitate defragmentation to improve performance or repartitioning to adapt to the amount of data being mirrored—without changing the logical address of a logical block used by a database application. Unless otherwise indicated herein, the term "logical" refers to this database application logical mapping to the LBA layer. A database logical block comprises one or more sectors addressed via an LBA. A database logical address is a pointer to a database logical block. Therefore changing LBAs is transparent to the database application.

The LBA location of the data mirrored in a secondary data segment may differ from the LBA location of the data in the first data segment in the preferred embodiment. However, the logical address can be used to access the data stored in both the first data segment and the secondary data segment. Each partition includes a plurality of logical blocks. In one embodiment, a logical block includes an integral number of database records but records may cross disk block boundaries. In a preferred embodiment, a logical block is the unit of transfer to and from the disk. Alternative embodiments for the unit of transfer include individual records, groups of records, or other relations such as tables, views, and indices. Each logical block of a secondary data segment on a disk contains all the data that is contained in the corresponding logical block in the first data segment on another disk. Thus, if an indexed database record comprising row 1 of a table is stored in logical block 48 in the first data segment, it is also stored in logical block 48 in its corresponding secondary data segment.

In one embodiment of the invention, the disk 108 has exactly one first data segment and at least one secondary data segment. There may be more than one secondary data segment. Each secondary data segment stores a logical mirror of the data slice stored in the first data segment of another physical disk. The logical mirror may contain only data that is marked for mirroring, rather than the entire content of the respective first data segment. Thus, upon failure of any disk, a logical mirror of a data slice stored in the first data segment of that disk is available from at least one secondary data segment on another disk. As shown in FIG. 1, P4 is the first data segment of disk 108-n. M4 is the secondary data segment of disk 108-1. The secondary data segment M4 is used to mirror first data segment P4, such that if disk 108-n fails, the data stored in first data segment P4 can be accessed from its logical mirror as stored in the secondary data segment M4 on disk 108-1.

As shown in FIG. 1, both secondary data segment M4 on disk 108-1 and first data segment P4 on disk 108-n include logical blocks 1-4. In this example, logical blocks 1-4 are LBA contiguous in first data segment P4, but in secondary data segment M4 only logical blocks 1-3 are LBA contiguous. Each SPU performs a logical mapping so that even though the logical blocks 1-4 are not stored in the same LBA locations and are non-contiguous, logical block 4 on both secondary data segment M4 and first data segment P4 store the same indexed data.

Figure 3:
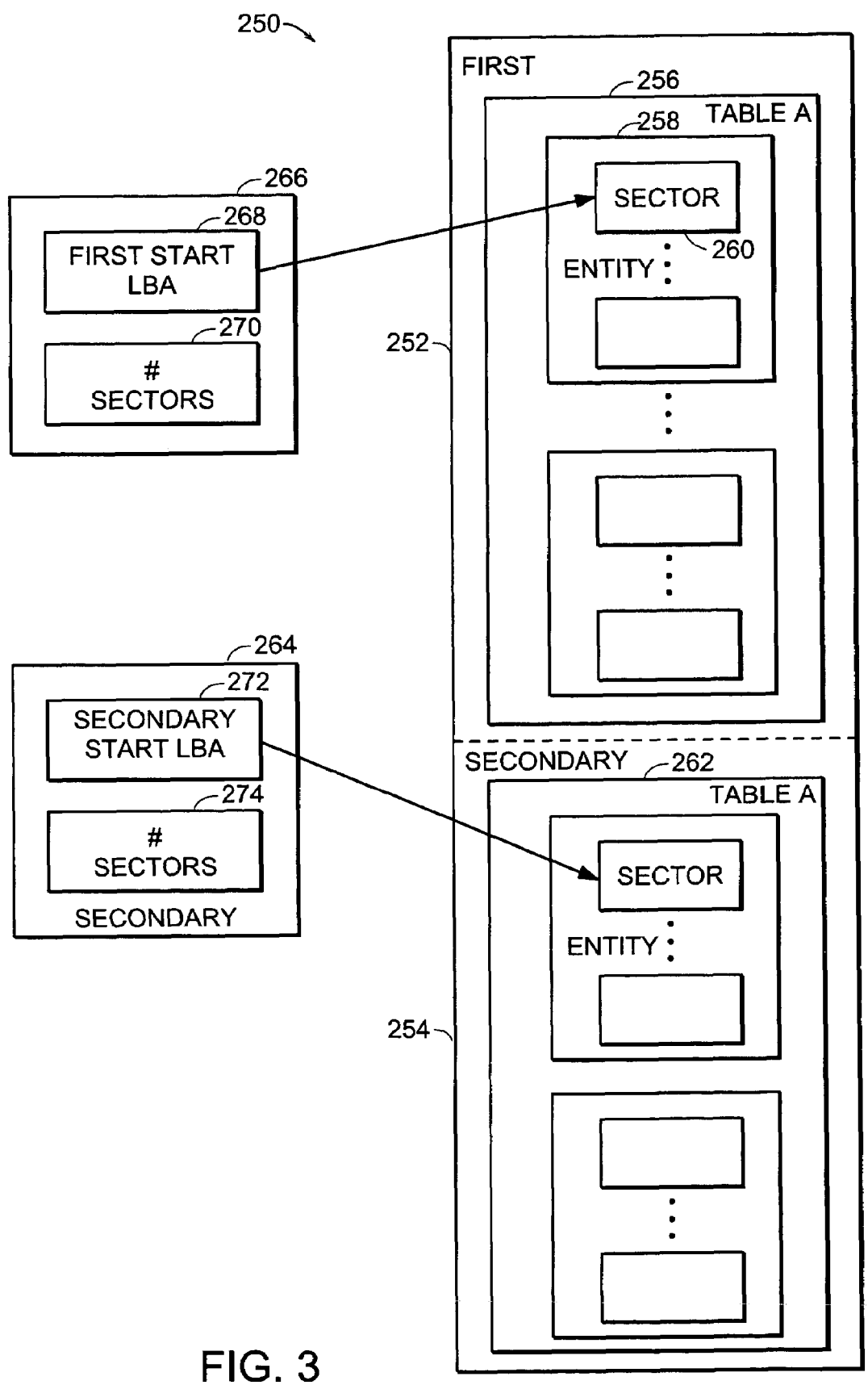
FIG. 3 is a block diagram illustrating data stored in the first and secondary data segments.

FIG. 3 is a block diagram illustrating data stored in the first data segment 252 and secondary data segment 254 of a disk 250. The start LBA registers 268, 272 and number of sectors register 270, 274 define the respective partition. The LBA address stored in first start LBA register 268 is of the first sector in the first data segment 252. The LBA address stored in the secondary start LBA register 272 is the address of the first sector in the secondary data segment 254. Each data segment is subdivided into a number of fixed-length extents 258. Each extent 258 has a fixed number of sectors 260. Thus, the address of the first sector in each extent can be computed knowing the number of the extent in the data segment and the number of sectors per extent. A plurality of extents are allocated for a table. For example, FIG. 3 shows Table A 256 having a plurality of extents 258 with each extent having a plurality of sectors 260. A mirror of Table A 262 is stored in the secondary data segment 254. The mirror of Table A is stored at the same entity location in the secondary data segment 254 as Table A in the first data segment 252. Thus, a record stored in the nth sector in the mth entity in Table A in the first data segment 252 is also stored in the nth sector in the mth entity in mirror of Table A in the secondary data segment 254 even though the sectors have different LBA addresses on the disk.

The logical SPU block, for example, the nth block in the mth entity is converted to a logical block address for a sector on the disk storing the block in both the first data segment and the secondary data segment. The logical block address for the logical SPU address is computed knowing the start LBA for the data segment, the entity number and the number of sectors per entity.

Figure 4:
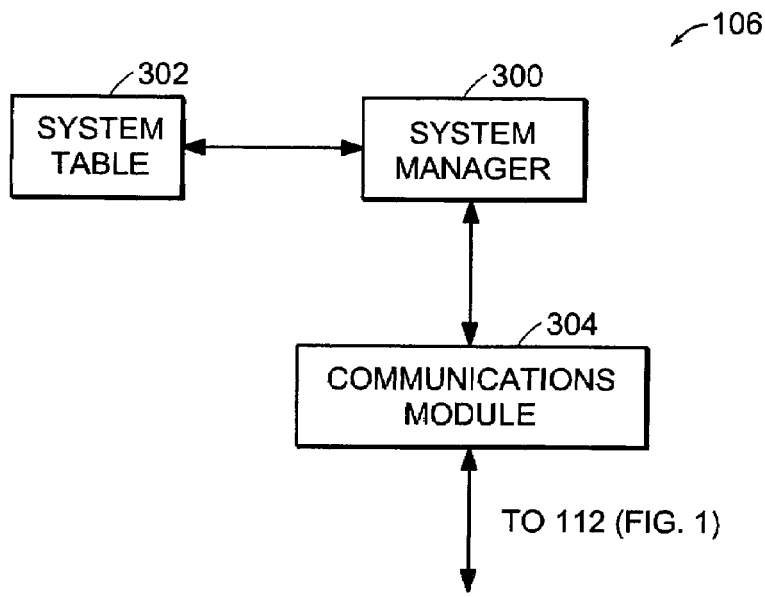
FIG. 4 is a block diagram of software modules included in the host for managing the SPUs in the data appliance shown in FIG. 1.

FIG. 4 is a block diagram of software modules included in the host 106 for managing SPUs in the data appliance shown in FIG. 1. The host includes a system manager 300, a system table 302, and a communications module 304.

At system startup, the system manager 300 assigns a logical identifier (LID) to each SPU in the data appliance. For example, for the configuration shown in FIG. 1, the system manager assigns LID 0 to disk 108-1, LID 1 to disk 108-2, LID 3 to disk 108-3, LID 5 to disk 108-4 and LID 4 to disk 108-n. The system manager 300 in the host ("host system manager") creates a logical identifier map mapping logical identifiers to addresses on the storage network. The host system manager 300 provides a copy of the logical identifier map to each SPU in the system by forwarding the map over the network 112 (FIG. 1) through the communications module 304. The logical identifier map includes the logical identifier of the disk containing the secondary data segment corresponding to the first data segment on the disk coupled to the SPU, the logical identifier assigned to the disk containing the first data segment corresponding to the secondary data segment on the disk coupled to the SPU, and the addresses associated with each SPU. The logical identifier map is maintained by the host system manager 300 in the system table 302 and a new copy is forwarded to each SPU upon any change in the configuration.

In a typical commodity disk drive, the disk rotational velocity of a disk remains constant, but the relative velocity between the disk and the head varies with disk radius. Data is read from and written to the disk at a constant bit rate. However, all of the tracks are not the same size. In one embodiment, inner tracks can be a few inches smaller than outer tracks. If one rotation of the disk takes N seconds, more data is read from or written to the longer track per second than from or to the shorter track. Thus, the data transfer time differs dependent on the physical location of the data on the disk.

The storage manager 404 (FIG. 5) in the SPU 110 takes advantage of these physical properties when it defines first data segments and secondary data segments for its disk. To increase the data transfer rate, the first data segment includes logical blocks that map to tracks on the disk having the fastest data transfer rate. The secondary data segment includes logical blocks that map to tracks on the disk which have a slower data transfer rate than the sectors in the first data segment. Tracks with the slower access rate are allocated to the secondary data segment because data is only read from the secondary data segment in the event of failure of the corresponding first data segment. However, in an alternate embodiment the sectors with the slowest data transfer times may be located on the outer tracks of the disk.

In one embodiment, the storage manager 300 defines the start address and final size of the first data segment and the second data segment when the disk is initialized, after which no changes are made to the size or location of the two data segments. When the size of the two segments are the same, this method insures that there will be enough disk space to mirror all of the data on each first data segment.

In another embodiment, the storage manager 300 defines the start address and initial size of the first data segment and the second data segment when the disk is initialized, but allows the size of each segment to grow dynamically in response to demand. When a request is received to store new data in a first data segment, the storage manager 300 expands the size of the first data segment as necessary to accommodate the new data. When a mirroring request is received to store a mirror copy of data in a second data segment, the storage manager 300 expands the size of the second data segment as necessary to accommodate the mirrored data. When the distribution of data across the first data segments of the plurality of disks is uneven, this method makes better utilization of disk space.

The system manager 300 takes other factors into account when configuring the mirroring topology, such as the capabilities of the local controllers to process the data, the complexity of the data, and usage patterns In the embodiment shown, the system manager is executed in the host. However, in alternate embodiments, the system manager may be executed in one or more of the SPUs.

Figure 5:
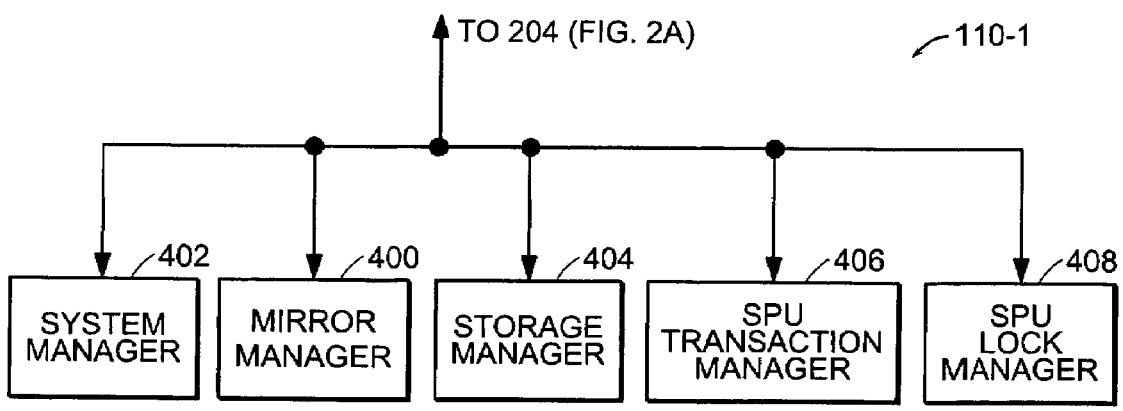
FIG. 5 is a block diagram of software modules included in each of the SPUs for managing mirroring of data in the data appliance shown in FIG. 1.

FIG. 5 is a block diagram of software modules included in each of the SPUs for managing the mirroring of data in the data appliance shown in FIG. 1. The SPU includes an SPU system manager 402, a mirror manager 400, and a storage manager 404. The communication within an SPU may be accomplished by function calls between various system components.

While the system manager 300 controls the mirroring topology, the storage manager 404 controls partition size and which data should be mirrored, and the mirror managers 400 in the controllers 122 coupled to the disks containing the corresponding first and secondary data segments coordinate the actual mirroring independently. In such a way, mirroring is autonomous from and transparent to the host.

Mirroring is optional for any given data object, but for those objects mirrored, the mirror manager 400 handles mirroring. In such a case, the mirror manager 400 maintains at least one redundant and consistent copy of all indexed data stored on the first data segment of the SPU by communicating any change in that data to the mirror manager in at least one other SPU. The sending SPU communicates any modification to a receiving SPU over the data communication network. The mirror manager in a receiving SPU receives the data to be written in a secondary data segment and calls its respective storage manager 404 to perform the write operation to write the data to the secondary data segment. In one embodiment of the invention, the system may be database-aware. That is, data may be written by the storage manager 404 only in response to a commit command, thus saving a number of writes. Similarly, after the commit request is sent to the primary SPU, the receiving SPU may acknowledge the commit to the host for the sending SPU, thus reducing the number of required acknowledgements.

The storage manager 404 processes all requests to read or write data to a first or secondary data segment of a disk. If the storage manager 404 encounters a singe-sector read error, that sector is invalidated and the data is re-written to that sector from the secondary data segment of the drive mirroring the data associated with that sector. In one embodiment, normal requests to read and write that sector are delayed until the data is re-written. If the mirror copy of the sector's data is successfully re-written, then pending requests are executed in order, starting with the original read request. If the mirror copy of the data cannot be read or if the sector cannot be re-written, the SPU system manager 402 treats the disk as having failed, and contacts the host system manager 300 to initiate failover processing. A further advantage the storage manager leverages is that the logical addresses are the same for both a primary data slice and its mirror data slice. Consistent logical addresses allow only the disk ID and segment ID to change while the logical addresses remain the same.

When an SPU fails to respond, the system manager 300 (FIG. 4) in the host performs a failover operation by switching all requests for data stored on the first data segment of a disk associated with the failed SPU to an SPU storing a logical mirror of the failed first data segment. There can be different failover modes depending on the SPU configuration. For example, where a controller is associated with more than one disk, and the controller itself fails, requests for data stored on the first data segment of each associated disk are switched to one or more SPUs containing the corresponding mirrors. Similarly, in the instance where a controller is associated with multiple disks and one of the disks fails, only requests for data stored on the first data segment of that disk are necessarily rerouted to the SPU containing its mirror.

When failover is detected and is due to an SPU failure, if a spare SPU is available then the system manager 300 (FIG. 4) issues a request to regenerate the first data segment of the disk associated with the failed SPU on the disk associated with the spare SPU using the secondary data segment mirror for the first data segment associated with the failed SPU.

After successfully regenerating the primary data slice on a disk associated with the spare SPU (or, in the case of a disk failure, on a spare disk associated with the same SPU), the mirror manager 400 restores normal operation by redirecting new requests for data from the disk containing the mirror data slice to the disk containing the new primary data slice. In the case of a failed SPU, the mirror manager in the spare SPU can also regenerate the mirror data slice of a disk associated with the failed SPU on the disk associated with the spare SPU. Similarly, in the case of a failed disk, the mirror manager in the original SPU can regenerate the mirror data slice on a spare disk.

Figure 6:
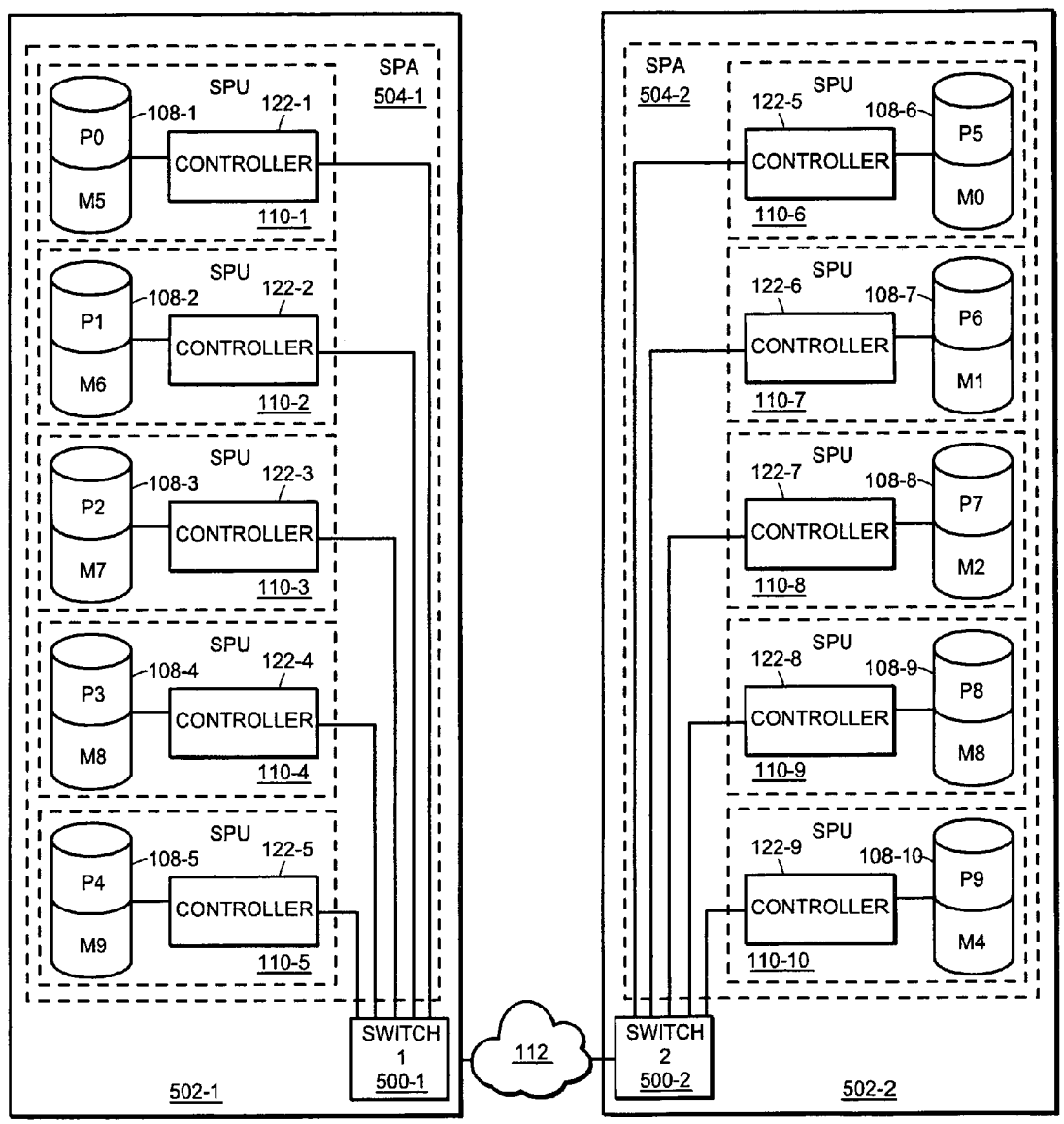
FIG. 6 is a block diagram illustrating two racks of SPUs for mirroring data in the database appliance shown in FIG. 1.

FIG. 6 is a block diagram illustrating two racks of SPUs for mirroring data in the database appliance shown in FIG. 1. Each rack 502-1, 502-2 includes a respective Snippet Processing Array (SPA) 504-1, 504-2 and a respective network switch 500-1, 500-2. Each SPA 504-1, 504-1 includes a plurality of SPUs. SPA 504-1 includes SPUs 110-1, . . . 110-5 and SPA 504-2 includes SPUs 110-5, . . . 110-10. Each SPU 110-1, . . . 110-10 includes one of the disks 108-1, . . . 108-10. Each network switch 500-1, 500-2 is coupled to the SPU data communications network 112. In one embodiment, there are 14 SPUs per SPA and 9 SPAs per rack. Each rack has at least one switch, and preferably at least two for redundancy, coupled to each SPA.

As previously discussed, the first data segment of each disk is logically mirrored on a secondary data segment of another disk. In the embodiment shown, the first and secondary data segments are assigned such that the secondary data segment associated with a first data segment is located on a disk in another rack. For example, the secondary data segment M0 on disk 108-5 in rack 502-2 is the logical mirror of the first data segment P0 on disk 108-1 in rack 502-1.

Upon a failure of disk 108-6 in SPA 504-2, controller 122-1 accesses both secondary data segment M5 and first data segment P0. The system manager 300 regenerates both P5 and M0 on a spare disk because M0 and P5 are both on failed disk 108-6. The response time for requests for data stored in disk 108-1 are slower during the regeneration operation. Alternatively, upon failure of rack 502-1, for example, due to a failure in switch 500-1, the data slice stored in first data segment P0 is still accessible on secondary data segment M0 on disk 108-6 in rack 502-2.

Figure 7:
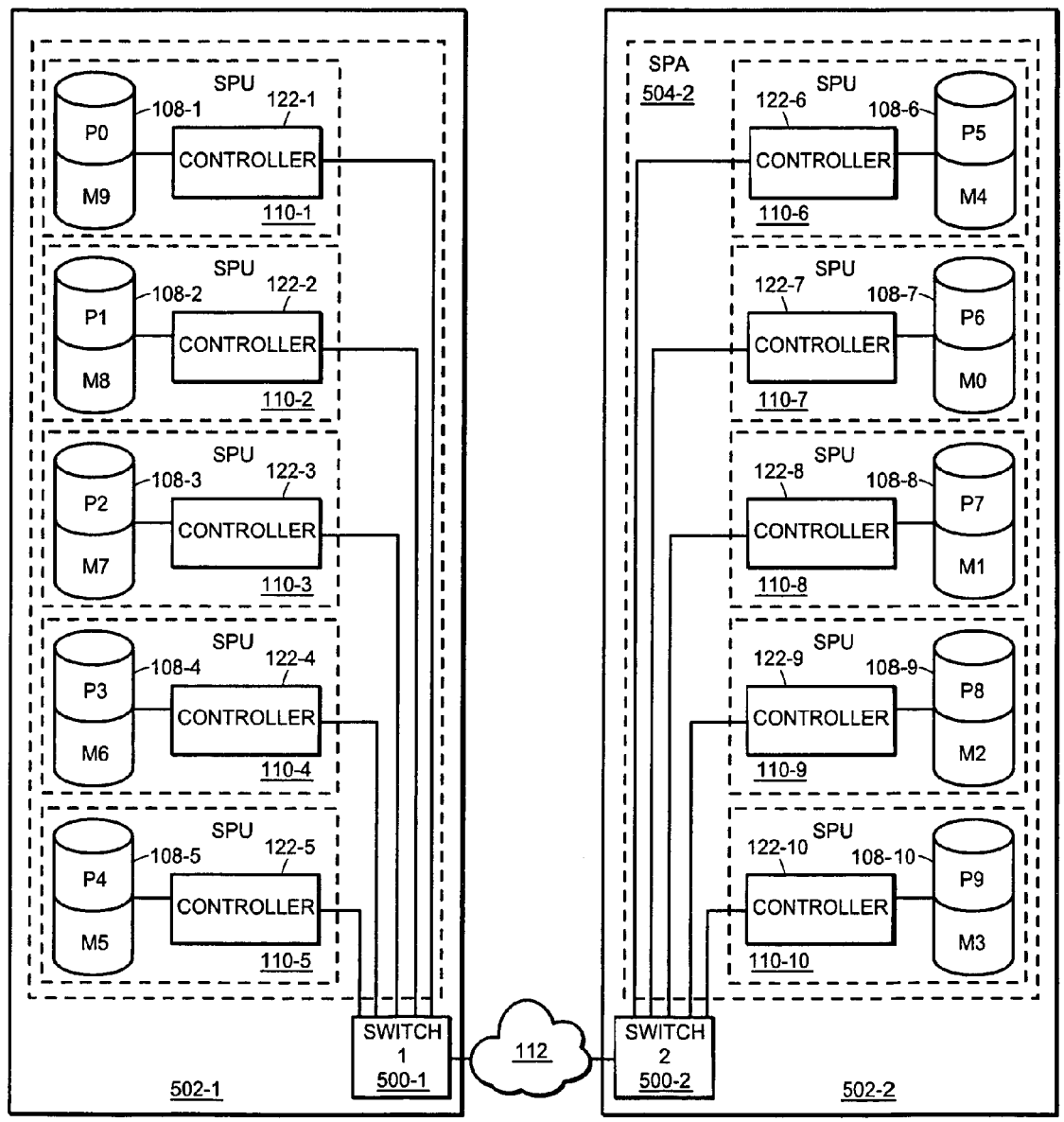
FIG. 7 is a block diagram of another partitioning scheme for assigning first and secondary data segments on the disks shown in FIG. 6.

In order to increase the response time for processing database requests upon failure of a first data segment, the segments are assigned so that if a first data segment and a secondary data segment are stored on a first disk, the mirror data slice for the first data segment and the primary data slice for the secondary data segment are not stored on the same disk. FIG. 7 is a block diagram of such a scheme for assigning first and secondary data segments on the disks shown in FIG. 6 to increase response time during a regeneration operation. The first data segment on disk 108-1 is P0 and the secondary data segment on disk 108-1 is M9. M0, the secondary data segment for P0 is stored on disk 108-7 and P9, the first data segment for secondary data segment M9 is stored on disk 108-10. Thus, in the case of a failure of disk 108-1, disk 108-7 is accessed to regenerate P0 and disk 108-10 is accessed to regenerate P9 while disk 108-8 acts as the first data segment for P0 data. Thus, data for the regeneration operation is stored on two disks 108-1, 108-8 increasing the availability of each disk to perform database operations.

Each disk can be further segmented to provide a plurality of secondary data segments and one first data segment on each disk. Data redundancy is increased by storing a plurality of 'logical mirrors' of the first data segment, with each 'logical mirror' being stored in a secondary data segment of a different disk. The system manager switches access to one of the secondary data segments upon detecting failure of the disk storing the first data segment. The presence of multiple mirrors of a data slice provides redundancy in the case of multiple failures. While in failover mode, several options are available. In one embodiment, one of the multiple mirrors is chosen as the replacement. In another embodiment, the multiple mirrors share the load of providing the data from primary data slice lost in the failure. To minimize the performance degradation that can occur during failover, the rebuild process can be shared among the mirror managers in the SPUs having a secondary data segment for the failed first data segment.

Multiple mirrors also provide the benefit of shared load in regenerating a failed disk. As a spare SPU is allocated, the data used to recreate the failed disk is pulled from each of the multiple mirrors in parallel, rather than one single mirror bearing the entire load.

Figure 8:
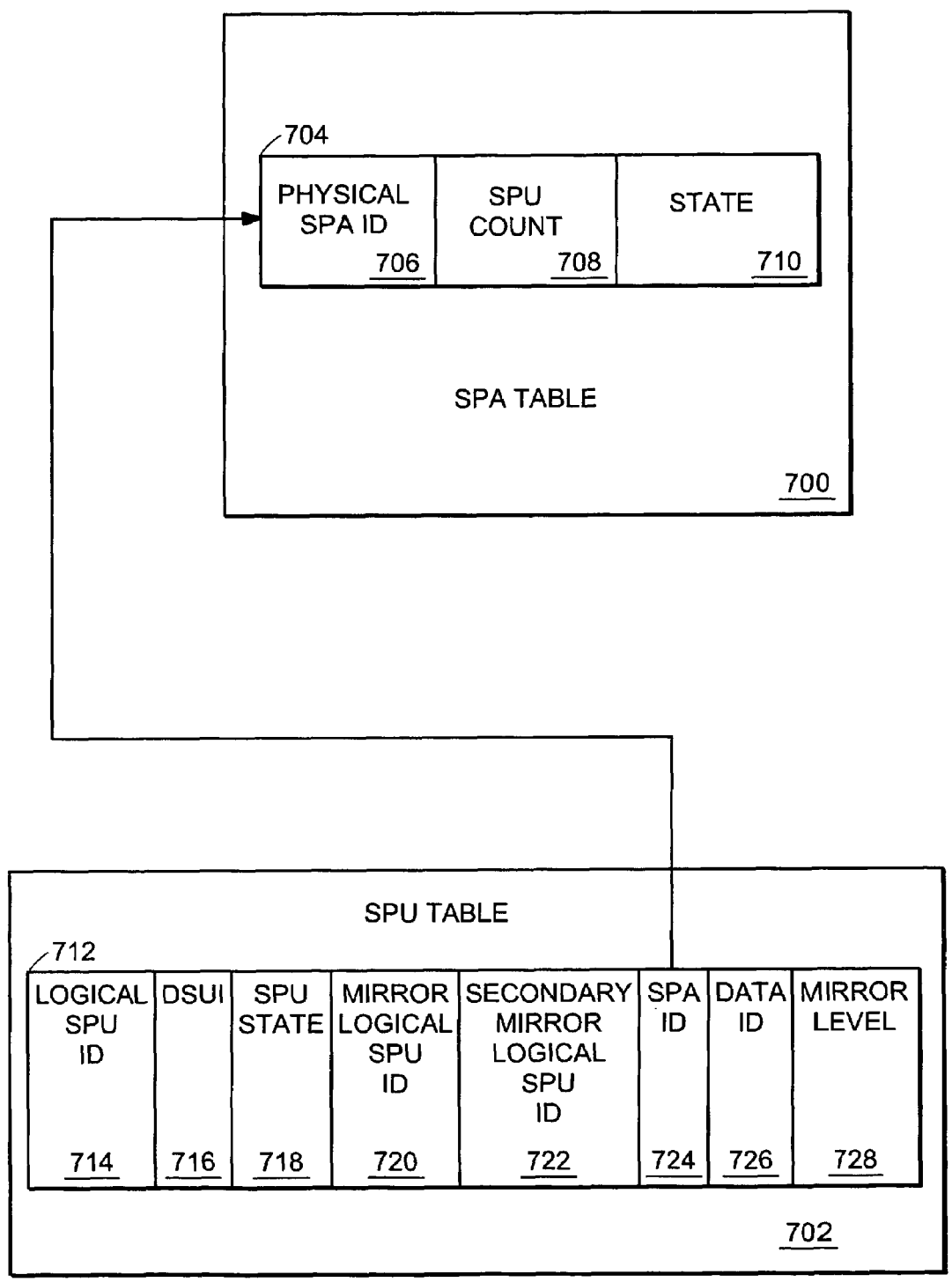
FIG. 8 is a block diagram of the SPA table and an SPU table in the system manager shown in FIG. 4.

FIG. 8 is a block diagram of an SPA table 700 and an SPU table 702 in the system manager 300 shown in FIG. 4. The system manager manages the SPA table and the SPU table. The SPA table includes an SPA entry 704 for each SPA in the database appliance 100. Each SPA entry 704 includes a physical SPA identifier 706, an SPU count field 708, and a state field 710. The SPU count 706 stores a number indicating the number of SPUs installed in the SPA. The state field 710 indicates the current state of the SPA which can be 'in use', 'spare', 'recovering', 'damaged' or 'dead'. An SPA is 'in use' if it is currently working and in use by the database appliance. The SPA is 'spare' if it is working but not in use. An SPA is 'recovering' if it is in the middle of a recovery operation. An SPA is 'damaged' if it is not functional but potentially recoverable. An SPA is 'dead' if it is completely non-functional and in need of replacement. The physical SPA identifier 706 stores a number assigned to the SPA which can be assigned by means of an external switch connected to the SPA.

The SPU table 702 includes an SPU entry 712 for each SPU installed in the SPA. The SPA identifier field 724 stores an identifier for the SPA in which the SPU is installed. Each SPU is assigned a logical identifier by the host system manager 300 on initialization. The logical identifier is stored in the logical SPU identifier field 714 in the SPU entry 712. The SPU entry also includes a Disk Storage Unique Identifier (DSUI) field 716, a mirror logical SPU identifier 720, a secondary mirror logical SPU identifier 722, a Data Identifier 726 and a mirror level field 728. The mirror logical SPU identifier 720 is a logical identifier assigned by the system manager to the SPU storing the logical mirror of the first data segment in a secondary data segment on this drive. The secondary mirror logical SPU identifier 722 is a logical identifier assigned to an SPU storing another logical mirror of the first data segment. If additional mirrors are desired, the SPU table 702 can be expanded to accommodate the logical identifiers. The state of the mirror level field 728 selects when a write operation is reported as being complete. A user-selectable flag indicates whether the write operation can be considered complete (a) when written only to the first data segment, or (b) when the write to both the first data segment and the secondary data segment is complete.

Figure 9:
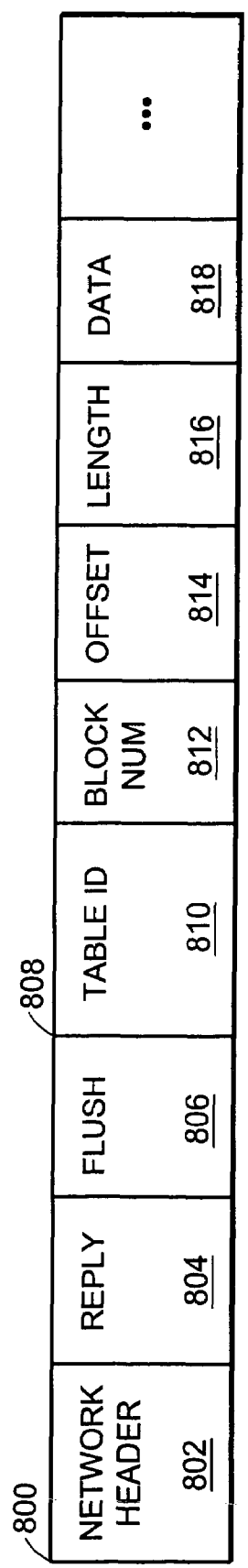
FIG. 9 illustrates a packet of database requests sent by the mirror manager in the primary SPU to the secondary SPU.

FIG. 9 illustrates a packet of database requests sent by the mirror manager in the primary SPU to the secondary SPU. Each packet of requests 800 includes a network header 802 that includes the address for the receiving SPU. The packet of requests includes a reply field 804 and a flush field 806. The reply field 804 indicates whether an acknowledgment is required when a packet of requests 800 is received. The flush field 806 indicates whether an acknowledgment is required when all of the updates have been performed.

Each request 808 includes a table identifier 810, a block number within the identified table 812, a byte offset within the block 814, the number of bytes to be changed 816 and the new data 818 to be written to the block.

Figure 10:
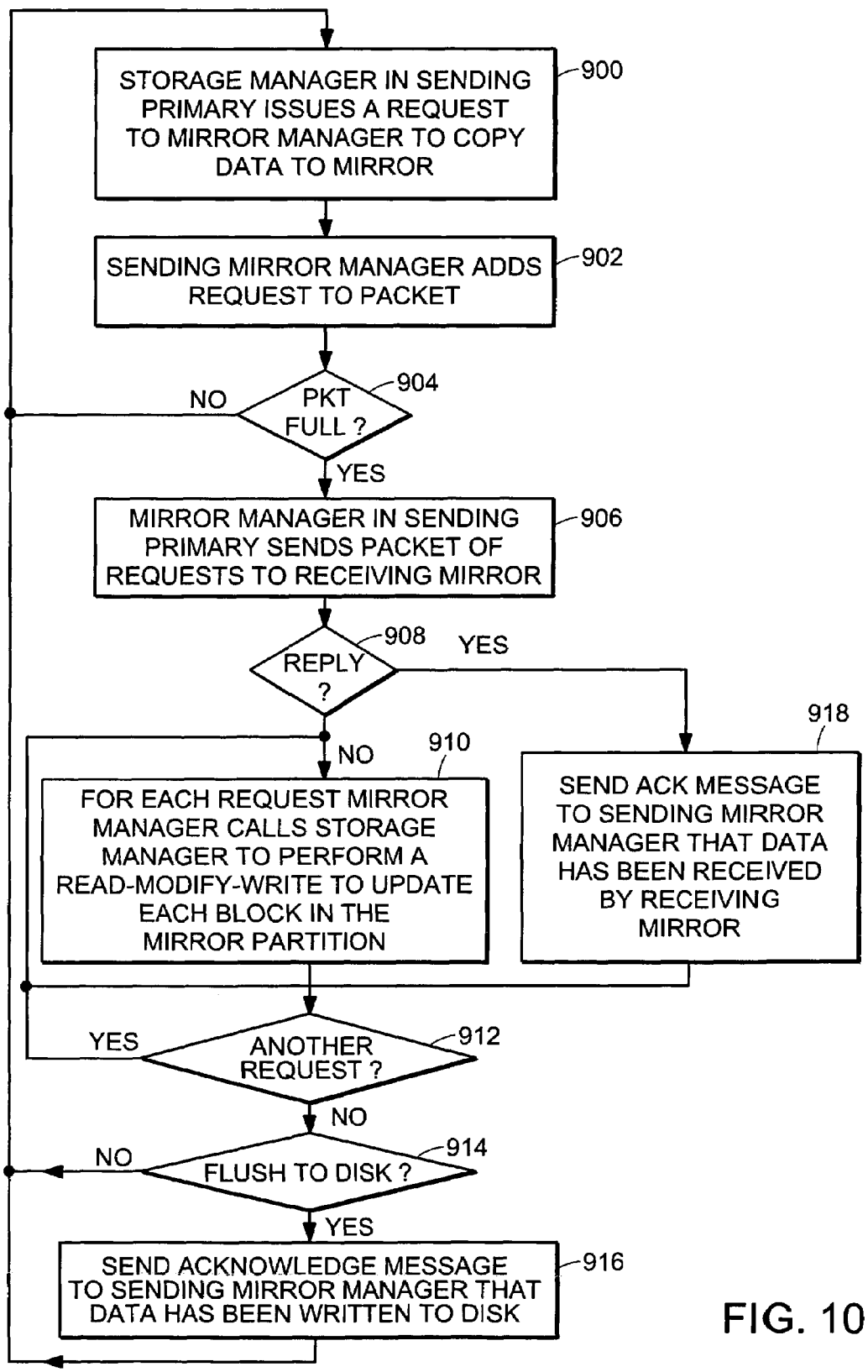
FIG. 10 is a flow diagram illustrating the method for mirroring data implemented in any one of the SPUs shown in FIG. 7.

FIG. 10 is a flow diagram illustrating the method for mirroring data implemented in any one of the SPUs shown in FIG. 7. The logical mirror of a first data segment is always stored on a different storage device than the first data segment so that if the storage device containing the first data segment is unavailable, the data can be accessed from the storage device containing the secondary data segment logical mirror. As discussed in conjunction with FIG. 5, each SPU includes a storage manager 404 and a mirror manager 400. The storage manager 404 manages access to the disk. The mirror manager 400 controls the forwarding of data to another SPU assigned as its mirror. The flowchart illustrates the update of the secondary data segment by the mirror manager in each SPU. The first data segment in the first SPU is referred to as the sending primary and the secondary data segment in the second SPU is referred to as the receiving mirror.

At step 900, the storage manager 404 in the first SPU issues a request to the mirror manager 400 in the first SPU to copy data to the receiving mirror. Processing continues with step 902.

At step 902, the mirror manager 400 in the first SPU receives the request from the storage manager and adds the request to a packet of requests 800 to be sent to the receiving mirror. Processing continues with step 904.

At step 904, the mirror manager in the first SPU determines if the packet of requests 800 is ready to be sent. If so, processing continues with step 906. If not, processing continues with steps 900, 902 to add another request to the packet.

At step 906, the mirror manager in the first SPU sends the packet of requests 800 to the receiving mirror. Processing continues with step 908.

At step 908, the mirror manager 400 in the second SPU receives the packet of requests sent by the first SPU. The mirror manager determines from the state of the reply field in the received packet whether the mirror manager in the first SPU requires an acknowledgment that the packet was received. If so, processing continues with step 918. If not, processing continues with step 910.

At step 910, the mirror manager in the second SPU requests the storage manager to perform a read-modify-write to update the block with the modified data received in the request. Processing continues with step 912.

At step 912, the mirror manager in the second SPU examines the received packet to determine if there is another request to be processed. If so, processing continues with step 910. If not, processing continues with step 914.

At step 914, the mirror manager in the second SPU examines the flush field included in the received packet. If the flush field 806 indicates that a flush is required, the mirror manager in the second SPU sends an acknowledgment to the mirror manager in the first SPU to indicate that all of the updates received in the packet have been performed to the receiving mirror. Processing continues with step 916. If not, processing continues with step 900.

At step 916, the mirror manager in the second SPU sends an acknowledge message to the mirror manager in the first SPU to indicate that the data in the received packet has been written to the receiving mirror. Processing continues with step 900.

At step 918, the mirror manager in the second SPU sends an acknowledge message to the mirror manager in the first SPU to indicate that the packet of requests has been received. Processing continues with step 910 to process the next request in the packet.

Figure 11:
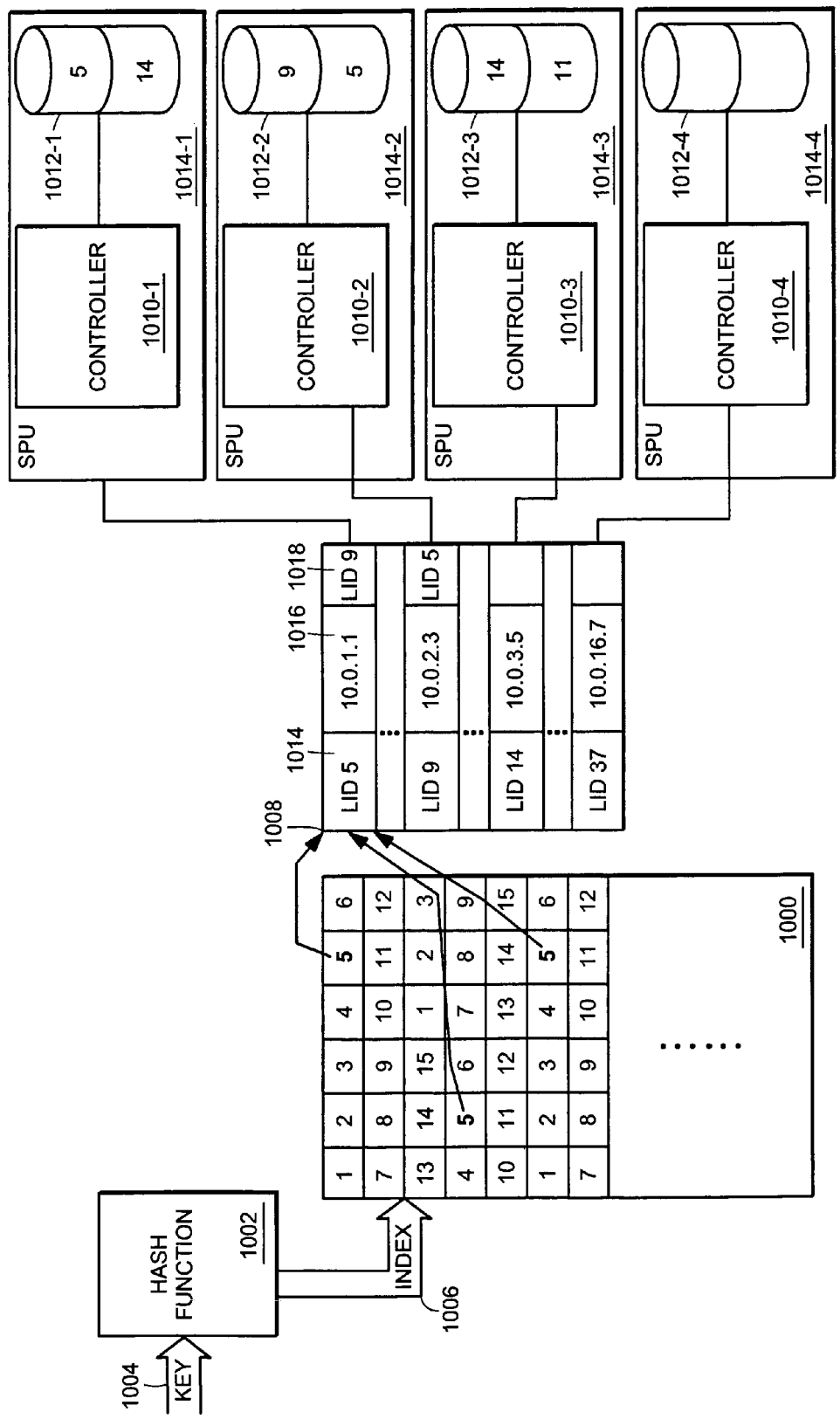
FIG. 11 is a block diagram illustrating access to the database.

FIG. 11 is a block diagram illustrating access to the database stored on disks 1012-1, . . . 1012-n. The system manager 300 in the host includes a distribution map 1000 that maps distribution keys to logical identifiers (LIDs) for the plurality of SPUs 1014-1, . . . 1014-n. Records are evenly distributed among all the SPUs in use by defining a distribution key for the table in which the records are loaded or inserted. A distribution key is a set of one or more fields whose values provide a high degree of uniqueness from one record to another.

Each logical ID is assigned to an SPU 1014-1, . . . 1014-n. In one embodiment, the distribution map 1000 has 64K entries. Each distribution map entry stores a logical ID. A hash function 1002 converts the distribution key 1004 of a data record into a 16-bit index 1006 for the distribution key 1004 in order to determine the logical ID of the SPU. The 16-bit index selects one of the entries in the 64K distribution map 1000. The logical ID stored in the selected entry identifies the SPU storing the record. The hash function and table results in striping data across the SPUs.

The system corresponding to the distribution map shown in FIG. 11 has 15 SPUs with each SPU assigned one of 15 logical identifiers with four of the 15 SPUs shown in FIG. 11. Thus, each entry in the distribution map 1000 stores one of the 15 logical identifiers assigned to the SPUs. In a system with 1000 logical identifiers, each logical identifier appears in a distribution map with 64K entries approximately 65 times.

Data is distributed through a process of determining the fields of the table to be used for the hash keys, determining a hash function to apply to the records, and a distribution map 1000, as shown in FIG. 11. The combination of these three components allows data to be distributed to the proper SPUs.

There are, however, cases in which an alternate distribution might be desirable. For example, in a case of hashing names to zip codes, it may be known from the manner in which the data is hashed that a certain set of zip codes hashes to a much greater set of names than another set of zip codes. In such a case, an alternate distribution map can be chosen in which each SPU contains a smaller number of 'higher-hit' zip codes. Conversely, each SPU contains a larger number of 'low-hit' zip codes.

Another example of an alternate distribution is in the case of a small table. In such a case, the table is located all on a single disk, rather than being spread thinly across all disks. In order to accomplish this, the hash function and distribution map elements are modified. The hash function can be changed on a per table basis, in this case, in order to ensure that all the records from a small table hash to the same value. Another method to accomplish the same result is by modifying the distribution map. In one embodiment, there are three standard distribution map types. The first map type maps the data across all the SPUs in the system. The second map type maps the data across all the SPUs save a select few. The third map type maps the data only to these select few SPUs. The third map type can be used to distribute small tables to a very small subset of the SPUs.

Selection of the distribution components can also be made based on the primary key/foreign key relationship of tables. For example, a table that has a primary key and a foreign key can be distributed based on the foreign key, which is the primary key of another table. In the event that a collocated join operation will be performed on the two tables in the future, it is beneficial to use the same distribution components for both tables. The optimizer chooses whether this operation would be beneficial and cost-effective. In such a case, the same hash function and distribution map from the second table is used for the distribution of the first table, using the second table's primary (and equivalently, the first table's foreign) key.

Data redistribution occurs in the same manner as data distribution, but may occur for different reasons, such as the addition of an SPU to the database appliance. Since distribution relies on three components: keys, hash functions, and a distribution map, a subset of these are changed for redistribution. In one embodiment, data is redistributed by simply modifying entries in the distribution map. Adding SPUs results in a shuffling of fields in the distribution map but does not change how the distribution fields are hashed, so the keys and hash function do not have to change. The distribution map stored provides a means of re-assigning records in such a way that only the minimum number of rows are moved to the new SPU. In the re-assignment process, certain cells of the distribution map are changed from the current SPU identifier to the ID of the added SPU. The distribution map is then applied to the data from each current SPU affected, so that a portion of the data is then re-assigned to the new SPU.

Data stored in the SPUs can also be redistributed by the host system manager 300 upon detecting a change in network topology. The change can be due to a configuration change or any change that effects efficiency. The change can be dependent on performance or because there is no available space on the plurality of disks. Redistribution occurs in the same manner as described above, with a change in any of the three distribution components.

The host system manager 300 generates a logical identifier map 1008. The logical identifier map 1008 includes the logical identifier (LID) for the secondary data segment storing the 'logical mirror' for each first data segment 1018, the logical identifier of the first data segment 1014 and the Internet Protocol ("IP") address assigned to the logical identifier of the first data segment 1016. A copy of the logical identifier map 1008 is forwarded and stored in each SPU.

All requests for accessing database records are forwarded to the logical identifier of the first data segment dependent on the entry selected in the hash table. In the case of an update to a record, the updated record is forwarded by the primary SPU to the secondary SPU. The secondary SPU updates the updated record in the 'logical mirror' stored in the secondary data segment.

In one embodiment, each logical identifier has an associated IP address. For example, as shown in FIG. 11, IP address 10.0.1.1 is assigned to the first data segment corresponding to LID 5, IP address 10.0.2.3 is assigned to the first data segment corresponding to LID 9 and IP address 10.0.3.5 is assigned to the first data segment corresponding to LID 14. All requests for LID 5 are directed to SPU 1014-1 by setting the destination address in each IP packet to 10.0.1.1. SPU 1014-1 also has a copy of the logical identifier map and forwards all updates received for LID 5 directly to SPU 1014-2 using the IP address for LID 9. SPU 1014-2 updates the 'logical mirror' of SPU LID 5 in the secondary data segment of disk 1012-2.

Figure 12:
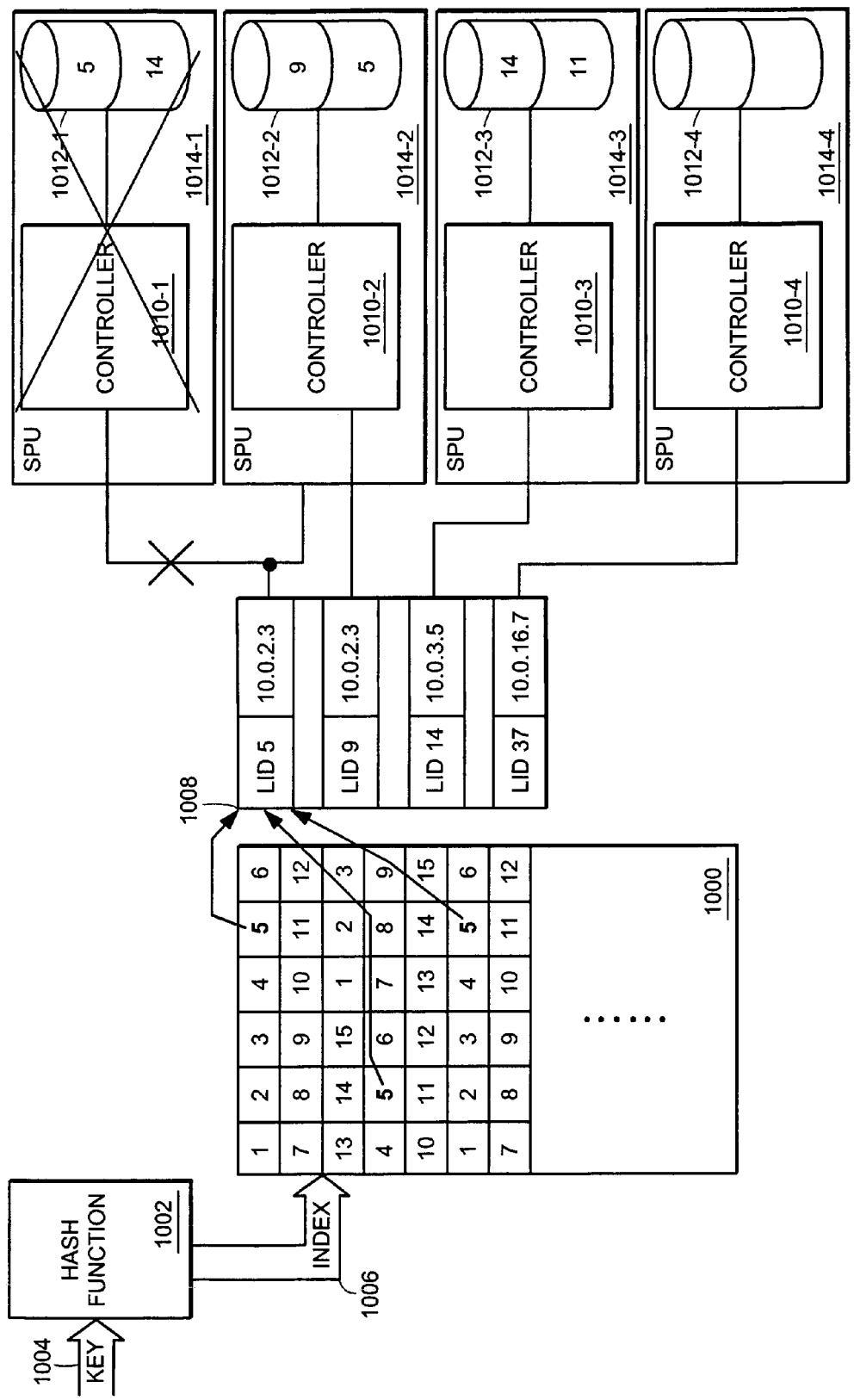
FIG. 12 illustrates failover in the database appliance upon detection of the failure of one of the SPUs.

FIG. 12 illustrates the failover process in the database appliance upon detection of the failure of one of the SPUs. When an SPU fails, the "logical mirror" of the data stored in the first data segment of the failed SPU is available in the secondary data segment of another SPU. After detecting failure of the first data segment, requests to the failed first data segment are re-routed to the other SPU. The failover to the secondary data segment is transparent to all users of the database appliance. The SPU system manager 402 in the SPU detects the failure of the SPU. For example, the failure can be due to a failure in the disk or in the cable coupling the controller to the disk. Upon detecting a failure, the SPU system manager 402 in the SPU notifies the host system manager 300 in the host by transmitting a message in an IP packet over the data communication network.

The host system manager 300 knows the location of a first data segment, mirrored in the secondary data segment of the failed disk, from the logical identifier table 1008 and informs this other SPU that its secondary data segment is no longer available. The notification can be included in a message sent in an IP packet to the other SPU. After receiving notification from the host system manager 300, the other SPU stops sending mirror update messages to the failed SPU.

The host system manager 300 knows the location of the secondary data segment, mirroring the first data segment of the failed disk, associated with the logical identifier from the logical identifier table 1008 and informs the secondary SPU to take over as the primary SPU for the logical identifier. The host system manager 300 updates the logical identifier table 1008 to indicate that the logical identifier for the primary SPU is not available and clears the field storing the logical identifier of the failed SPU. The host system manager 300 updates its logical identifier table 1008 to replace the IP address for the primary SPU with the IP address for the secondary SPU. For example, upon detecting failure of SPU 1014-1, the host system manager 300 replaces the IP address for logical identifier 5 10.0.1.1 with the IP address 10.0.2.3 for SPU 1014-2. The updated logical identifier table 1008 is forwarded to each SPU.

After the host system manager updates the logical identifier table, all requests for the failed first segment in the primary SPU are redirected to the secondary data segment in the secondary SPU. Old transactions are aborted from each SPU. While the secondary data segment corresponding to the failed first data segment is active, the secondary SPU processes received broadcast messages for both the first data segment and the secondary data segment and replies to the broadcast message twice. For unicast messages, the secondary SPU processes the request for the requested partition. The secondary SPU does not mirror any modifications to its secondary data segment.

Figure 13:
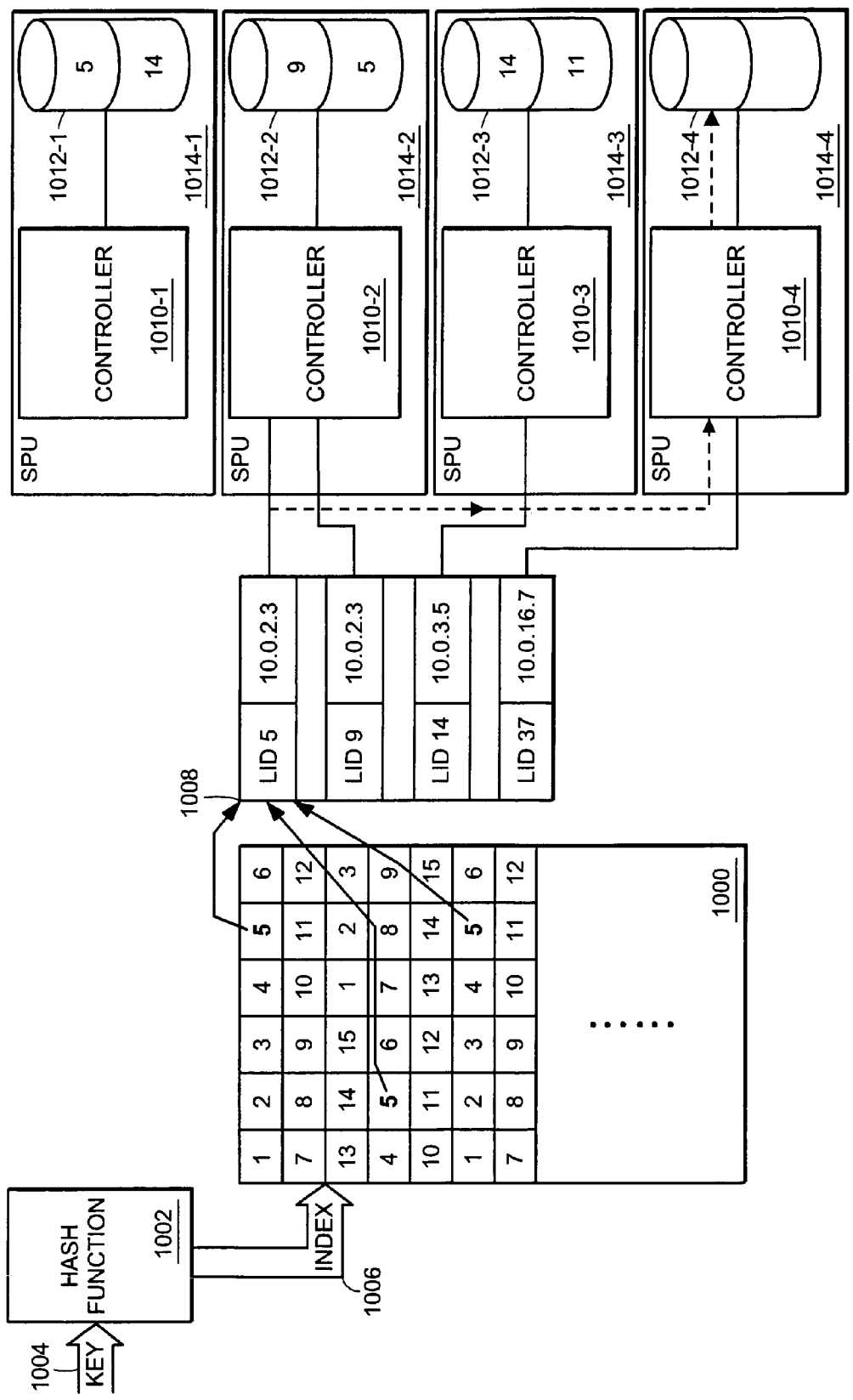
FIG. 13 illustrates regeneration of the first data segment of the failed SPU on a spare SPU.

FIG. 13 illustrates regeneration of the first data segment of the failed SPU on an available spare SPU. After the failover is completed, the host system manager 300 in the host issues a request to the mirror manager 400 in the secondary SPU for the failed primary SPU to rebuild the first data segment on the spare SPU. The request includes the logical identifier for the drive to which the logical mirror stored in the secondary data segment is to be copied. In the configuration shown in FIGS. 12-14, LID 37 is a spare SPU that can store a first data segment and a secondary data segment. The mirror manager for the secondary SPU sends a record, group of records, or block at a time directly to the spare SPU (LID 37) over the network 112 to be written to the first data segment on disk 1012-*n*. The host system manager 300 can select the order of the data to be moved. The order of the data to be moved can be dependent on an analysis of indices, which dictate the nature of the data to be moved, or dependent on user-defined preferences regarding the priority of data regeneration. For example, in the case of the parent-child relationship of views, the parent relations may be moved first. The reasoning behind this is that the children can be recreated from the parents; therefore the parents have a higher precedence in the case of regeneration. The user can also define preferences for certain relations to have higher regeneration priority. In an alternate embodiment, raw tables may be moved first.

Transactional changes including inserts, updates, deletes, commits, and aborts to LID 5 during and after the copy process are also sent to LID 37. Thus, the mirror manager for the secondary SPU (LID 5) acts as if its secondary data segment is the first data segment on the spare SPU (LID 37). Double writes to the first data segment and the secondary data segment can be avoided by determining whether the logical blocks have been copied to the first data segment on the spare SPU.

If there is a power failure or a crash of the secondary SPU or the spare SPU, the regeneration process is restarted by a command issued by the host system manager 300 in the host. The system manager is notified when the copying of the new first data segment is complete. The system manager records the new first data segment.

After the secondary data segment is copied to the new first data segment on the spare SPU, the host system manager 300 switches the segments so that the new first data segment is accessed first. The following steps are implemented by the host system manager to replicate state between the secondary SPU and the new primary SPU and keep the state valid in both SPUs during the switch over.

The spare SPU records the logical identifier for the logical mirror of its first data segment but does not send any data to the secondary data segment. The secondary SPU records that it is the mirror for LID 5. The system manager transmits a message to LID 37 and LID 9 to prepare to switch roles. To prepare to switch roles, LID 37 records that LID 9 is the mirror for the first data segment of LID 5, but no data is sent to the secondary data segment. LID 9 records that it is the mirror for LID 5. LID 9 initializes the receiving end of a mirror manager for the LID 5 partition, but does not receive any requests. LID 9 issues a message to LID 37 to request that LID 37 initialize its transaction manager 406 (FIG. 5) and lock manager 408 (FIG. 5).

After initialization, any data that LID 9 transmits to LID 37 is locked. LID 9 also sends LID 37 notice of any transactions that start, abort or commit, so that LID 37 can keep its transactional state up to date.

LID 9 sends its transaction and lock state to LID 37, along with some of its temporary tables. When LID 37 has received and integrated this data, it informs the host system manager 300 that it is ready to relieve LID 9 of responsibility for the LID 37 partition. While LID 9 is transmitting its transactional state to LID 37, and until it is told to stop servicing its LID 5 secondary data segment, LID 9 may also be sending data changes to LID 37. As noted above, LID 37 acquires locks on this data.

At this point, lock state and transactional state for the LID 5 partition is reflected on both LID 9 and LID 37. New update requests continue to be handled by LID 9, so LID 37's state will lag slightly.

The host system manager 300 updates its logical identifier in the Logical identifier table by storing the IP address for the old LID 37 in the slot for LID 5. The host system manager 300 sends the updated Logical identifier table to every SPU. All new requests for data on LID 5 are directed to the new primary SPU. Data modifications are sent through normal mirroring to LID 9. The system manager requests that LID 9 stop processing requests for both the first and secondary data segment on the disk. LID 9 terminates the lock manager and the transaction manager for the LID 5 secondary data segment and reverts to issuing all incoming requests to its first data segment. The system manager updates its Logical identifier table. The Disk Storage Unique Identifier ("DSUI") previously associated with LID 5 is not associated with LID 37 and is marked as dead. The performance of the database appliance returns to its pre-failure level. The only task that remains is to regenerate a new secondary data segment for LID 14.

Figure 14:
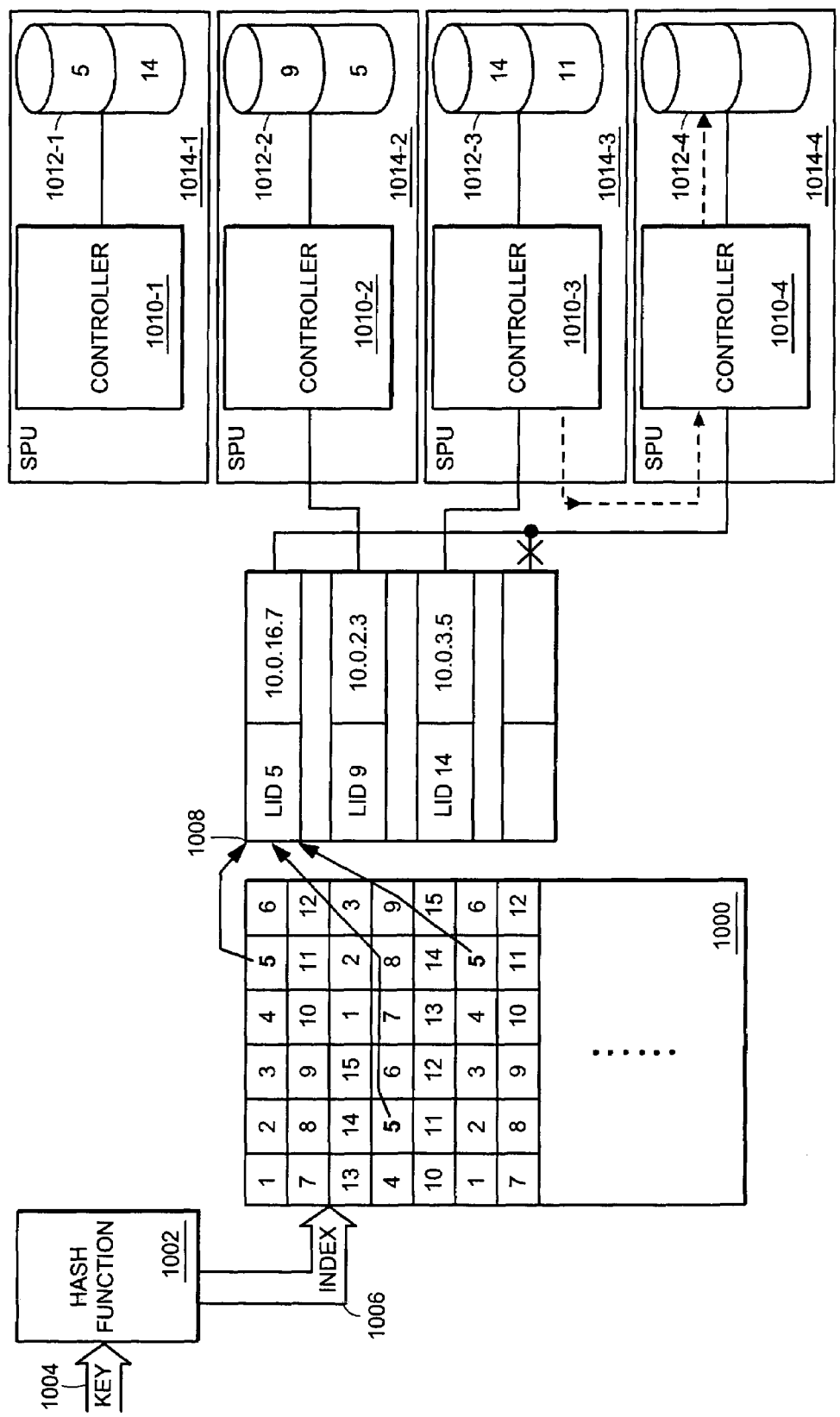
FIG. 14 illustrates regeneration of the secondary data segment of the failed SPU on a spare SPU.

FIG. 14 illustrates regeneration of the secondary data segment of the failed SPU on a spare SPU. LID 5 was the mirror for LID 14 before LID 5 failed. The regeneration of the secondary data segment for first data segment 5 is very similar to the task of regenerating a new first data segment.

The host system manager requests that the Mirror manager 400 create a new mirror for LID 14 on LID 5 (previously LID 37). The Mirror manager 400 iterates over the tables and indices on LID 14, sending a block at a time to LID 5. The Mirror manager 400 in LID 5 receives these blocks, and writes them to its secondary data segment. Transactional changes (inserts, updates, deletes, commits and aborts) to LID 14 during and after this copy process are sent to LID 5 using the normal mirroring process which has already been described in conjunction with FIG. 10. Double writes can be avoiding by determining whether the changes affect disk blocks that have already been copied. If there is a power failure or a crash of either SPU, the regeneration process restarts the copy process, under the direction of the host system manager. The host system manager 300 is notified when the copy is finished. The host system manager 300 records that LID 5 is now the mirror for LID 14. The database is now functionally restored to its pre-failure state.

FIGS. 12-14 describe a method for regenerating a failed disk on a spare SPU. However, the system may run out of spare SPUs. Thus, it may be necessary to create a spare SPU, although the system manager may choose to redistribute the data from the failed disk to the plurality of SPUs rather than create a spare, if space allows. The system can automatically create a spare SPU. The host system manager creates a spare processing unit by redistributing data stored on one of the SPUs among the plurality of SPUs. The host system manager redistributes the data stored on one of the SPUs by reassigning blocks in a file allocation table. In one embodiment, the redistribution of the data can be performed by a background task.

Figure 15:
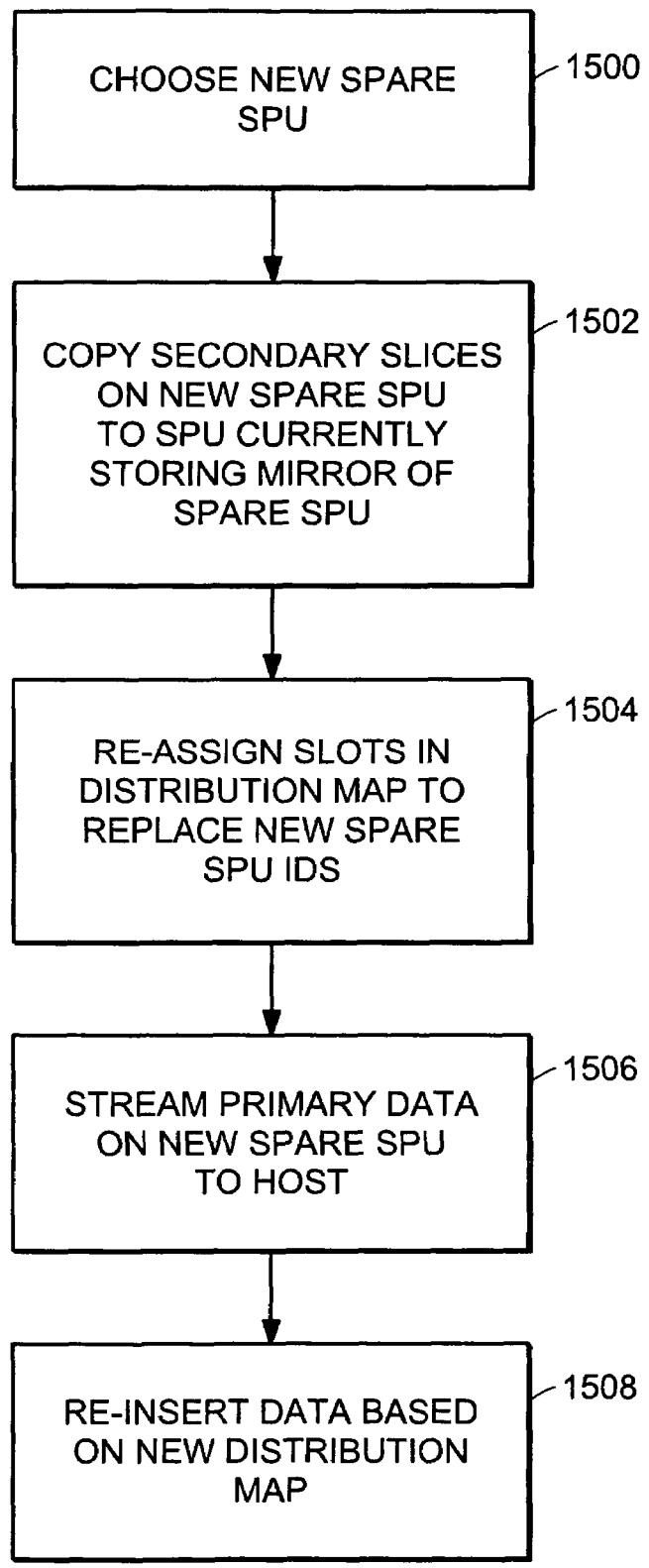
FIG. 15 is a flow diagram illustrating the method for creating a new spare SPU.

The creation of a spare SPU is accomplished through a series of system changes. FIG. 15 is a flow diagram illustrating the method for creating a new spare SPU. At step 1500, the SPU to be made spare ("New Spare SPU") is chosen by the system manager. At step 1502, the New Spare SPU's secondary data slices are copied to the SPU mirroring the New Spare SPU's primary data slice. In this manner, the second SPU mirrors the SPUs that the New Spare SPU formerly mirrored. At step 1504, the slots in the distribution map 1000 are then reassigned to logical identifiers so that all instances of the New Spare SPU's ID are replaced with any of the rest of the plurality of SPUs' IDs. The system manager may choose which IDs to use as it sees fit. At step 1506, the primary data slice from the New Spare SPU is then optionally streamed back to the host, where it is rehashed with the new distribution map. In the preferred embodiment, the data is rehashed on the SPUs. Finally, at step 1508, the data is reinserted, based on the new distribution map.

During regeneration of whole SPUs or their primary or secondary segments, the logical mirror of the failed primary segment may be doing triple-duty in that it is handling the data requests related to regeneration, while also responding to data access requests to its primary segment. In order to alleviate the load on the regeneration-participating SPU, data access requests for its primary segment may be instead handled by that segment's own logical mirror. Such re-assignment of the load helps maintain load balance during the regeneration process.

Figure 16:
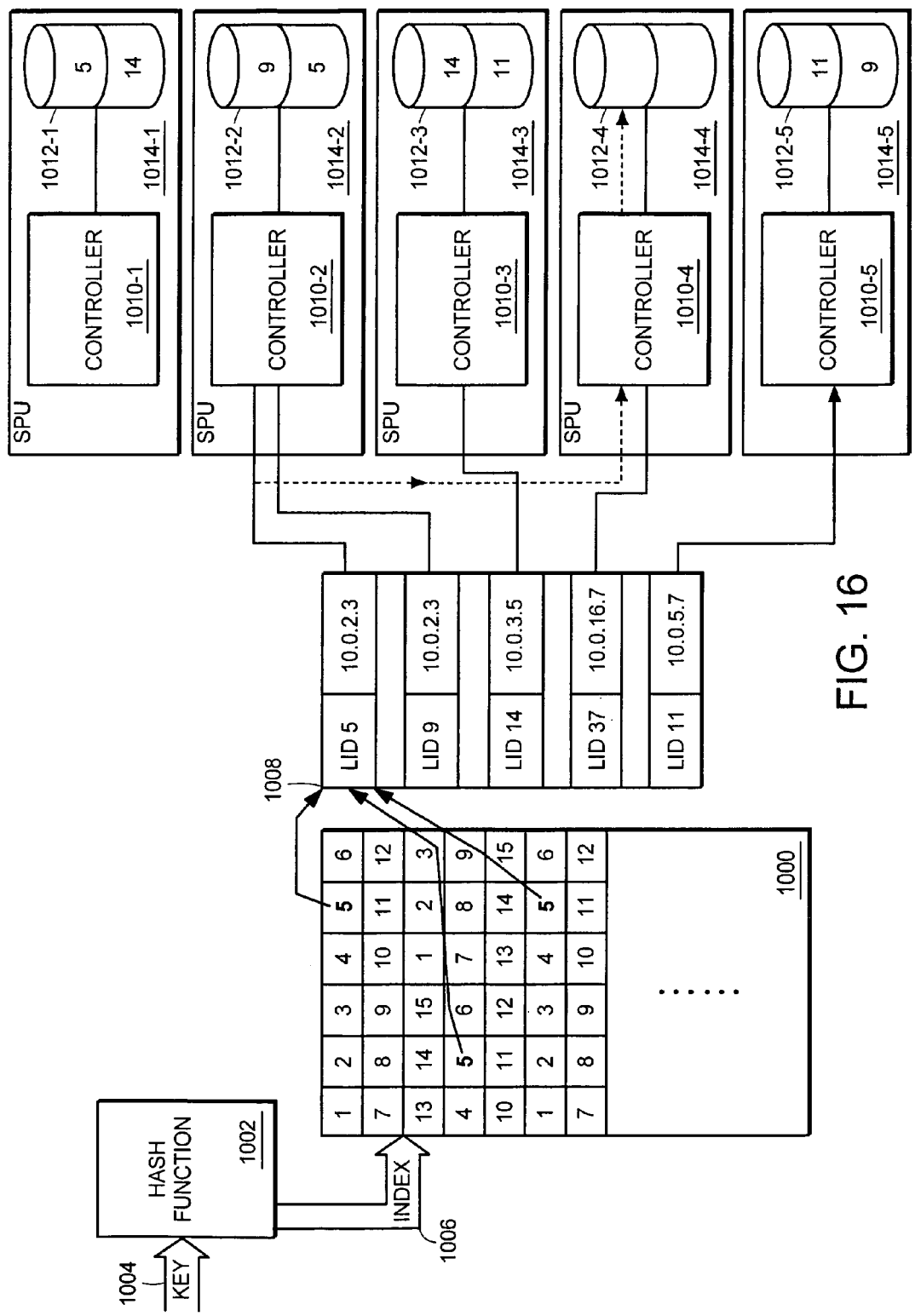

FIG. 16 and 17 illustrate regeneration of the first data segment of the failed SPU on an available spare SPU. Also illustrated is the handling of the data access requests to the primary segment of the mirror for the primary segment of the failed SPU by the logical mirror of that primary segment of the regeneration SPU. Briefly as illustrated in FIG. 17 when SPU#1's disk having segment contents "A/D" fails, the SPU#2's disk (having segment contents "B/A") is looked to for serving "A" images. SPU#2 was initially serving "B" images from its primary segment. In order to prevent overstressing the disk, the present invention has SPU#2 temporarily consider its segment (right-hand side) containing "A" images as its primary segment and begins copying images "A" from SPU#2 to the primary segment of the spare disk. Next SPU#3's disk is placed into double duty, serving both segments images "C" and "B". This places activity on both segments of a disk (SPU#3) that is not busy with serving copies of images A and D onto the spare disk for regenerating failed SPU#1. The segment containing images A on SPU#2 has two tasks, namely it is responsive to—querying against "A" and transmitting "A" to the spare SPU. Likewise, SPU#4, which was left with a mirrorless primary segment when SPU#1's disk failed, is serving primary segment images "D" and copying "D" to the spare SPU. After copying of images A (from SPU#2) and D (from SPU#4) to the spare SPU disk, the regenerated spare SPU disk (now SPU#5) replaces failed SPU#1, and SPU#2, #3, #4 return to normal duty with primary segments illustrated on respective left-hand side of each SPU.

Applying this to the example of FIG. 13, after the failover is completed, the host system manager 300 in the host issues a request to the mirror manager 400 in the secondary SPU for the failed primary SPU to rebuild the first data segment on the spare SPU. The request includes the logical identifier for the drive to which the logical mirror stored in the secondary data segment is to be copied. In the configuration shown in FIGS. 12-14 and 16, LID 37 is a spare SPU that can store a first data segment and a secondary data segment. The mirror manager for the secondary SPU sends a record, group of records, or block at a time directly to the spare SPU (LID 37) over the network 112 to be written to the first data segment on disk 1012-*n*.

During regeneration of the first data segment 1012-1 from the failed SPU (LID 5), the SPU containing its logical mirror (LID 9) has a fairly high load because it needs to handle both data copying and requests to its own first segment 1012-2. In order to decrease this load, the host system manager may redirect data access requests to segment 1012-2 to its logical mirror, located on a separate SPU (LID 11) that is not involved in the regeneration process. Redirection of the data access requests results in LID 11 handling more than a usual number of requests, but it also reduces the load on LID 9, thus balancing the load overall.

The host system manager 300 switches the segments so that the non-regeneration involved secondary data segment is accessed first. Data accesses to segment 1012-2 not involving data modification may be handled by LID 11 without involving LID 9 at all. In case of transactional changes including inserts, updates, deletes, commits and aborts to the first segment of LID 9 are first sent to LID 11. Thus, the mirror manager for the SPU (LID 11), which is not involved in the regeneration, acts as if its secondary data segment is the first data segment on the regeneration-performing SPU (LID 9). In one embodiment of the invention, the SPU participating in the regeneration process (LID 9) may delay writing those data modifications until the regeneration process is complete. In an alternative embodiment of the invention, data modifications may be written to disk as they arrive, while data access requests may be ignored because they will be handled by the noninvolved SPU (i.e., the SPU which is not involved in the regeneration).

After the secondary data segment from the regeneration-participating SPU is copied to the new first data segment on the spare SPU, the host system manager 300 switches the segments so that the new first data segment is accessed first. At the same time, the host system manager may also switch the segments such that the first data segment on SPU 9 is once again accessed first, before the secondary data segment on SPU 11. The following steps are implemented by the host system manager to replicate state between the secondary SPU and the new primary SPU and keep the state valid in both SPUs during the switch over.

The spare SPU records the logical identifier for the logical mirror of its first data segment but does not send any data to the secondary data segment. The secondary SPU records that it is the mirror for LID 5. The system manager transmits a message to LID 37 and LID 9 and to LID 9 and LID 11 to switch roles, correspondingly. To prepare to switch roles, LID 37 records that LID 9 is the mirror for the first data segment of LID 5, but no data is sent to the secondary data segment. LID 9 records that it is the mirror for LID 5. LID 9 initializes the receiving end of a mirror manager for the LID 5 partition, but does not receive any requests. Meanwhile, LID 11 initializes the receiving end of a mirror manager for the LID 9 partition. LID 9 issues a message to LID 37 to request that LID 37 initialize its transaction manager 406 (FIG. 5) and lock manager 408 (FIG. 5).

After initialization, any data that LID 9 transmits to LID 37 is locked. LID 9 also sends LID 37 notice of any transactions that start, abort or commit, so that LID 37 can keep its transactional state up to date. Similarly, LID 11 may send LID 9 notice of any transactions that start, abort or commit, so that LID 9 can keep its transaction state up to date.

LID 9 sends its transaction and lock state to LID 37, along with some of its temporary tables. When LID 37 has received and integrated this data, it informs the host system manager 300 that it is ready to relieve LID 9 of responsibility for the LID 37 partition. The host system manager 300, in turn, informs LID 11 that it is ready to relieve it of its responsibility of being the primary for LID 9. Later, when the host system manager 300 updates its logical identifier in the Logical identifier table by storing the IP address for the old LID 37 in the slot for LID 5, it also updates LID 9 and LID 11 so that LID 11 is no longer handling requests for the first segment of LID 9. After additional steps in finalizing the regeneration (see FIG. 13), the performance of the database appliance returns to its pre-failure level. The only task that remains is to regenerate a new secondary data segment for LID 14. In an alternative embodiment of the invention, during the regeneration of the new secondary data segment for LID 14, its secondary segment may also be relieved of some of its load, by, for example, delaying recording transactional changes.

The redirection of data access requests from a regeneration-participating SPU to the SPU not participating in the regeneration process may also be accomplished by the SPUs themselves, autonomously from the host. In such an arrangement, LID 9 and LID 11 may negotiate handling of the requests so that LID 11's secondary segment acts as the primary, while the host system may be entirely unaware of the arrangement. In such a way, load balancing may be performed without further burdening the host machine.

While this invention has been particularly shown and described with references to preferred embodiments thereof, it will be understood by those skilled in the art that various changes in form and details may be made therein without departing from the scope of the invention encompassed by the appended claims.

What is claimed is:

1. In a system of multiple disks, (i) each disk being logically divided into at least two segments, with a first segment of each disk being mirrored by a secondary segment of another disk, and (ii) having a processing unit associated with each disk, a method of regenerating data, said method comprising:

regenerating a first segment of a failed first disk on a spare disk using a mirror secondary segment of a second disk;

handling data access requests to a first segment of the second disk by a secondary segment of a third disk, wherein the secondary segment of the third disk is a mirror of the first segment of the second disk; and instructing, by a processing unit associated with the second disk, a processing unit associated with the third disk to handle data accesses to the first segment of the second disk for the duration of data regeneration.

2. A method of regenerating of claim 1, further comprising:

causing the third disk to act as a primary disk for data accesses to the first segment of the second disk for the duration of data regeneration.

3. A method of regenerating of claim 2, further comprising:

causing the third disk to stop acting as the primary disk for data accesses to the first segment of the second disk after regeneration is complete.

4. A method of regenerating of claim 1, further comprising:
copying data from a first segment of a fourth disk to the spare disk while the fourth disk also acts as a primary disk for data accesses to a secondary segment of the first disk for the duration of the data regeneration.

5. A method of regenerating of claim 1, further comprising:
forwarding, from the third disk to the second disk, data modifications for updating the first segment of the second disk.

6. A method of regenerating of claim 5, further comprising:
delaying, writing the data modifications to the first segment of the second disk until the step of regenerating is complete.

7. A method of regenerating of claim 5, further comprising:
responding, by the third disk, to the data access requests for the first segment of the second disk without forwarding them to the second disk.

8. A method of regenerating of claim 1, further comprising:
instructing, by the processing unit associated with the second disk, the processing unit associated with the third disk to stop handling the data accesses to first segment of the second disk after data regeneration is complete.

9. A system for regenerating data on a disk in a system of multiple disks coupled to one or more processing units, said system comprising:
a mirror of a first segment of a first disk, the mirror being a secondary segment on a second disk;
means for regenerating data on a certain disk using the mirror on the second disk; and
means for handling data access requests by a mirror of a first segment of the second disks, the mirror of the first segment of the second disk being located on a third disk, and the third disk acting as a primary disk for data accesses to the mirror of the first segment of the second disk for the duration of the data regeneration.

10. A system as claimed in claim 9, wherein:
the third disk acts as a primary disk for data accesses to the mirror of the first segment of the second disk for the duration of the regenerating of the data on the certain disk.

11. A system as claimed in claim 10, wherein:
the third disk stops acting as the primary disk for data accesses to the mirror of the first segment of the second disk after the regeneration is complete,
the second disk resuming as a primary disk for data accesses to its first segment, and
the first disk being effectively replaced with the regenerated certain disk.

12. A system as claimed in claim 9, wherein:
the third disk forwards to the second disk, data modifications for updating the first segment on the second disk.

13. A system as claimed in claim 12 wherein:
writing of the data modifications to the first segment of the second disk is delayed until copying of the mirror from the second disk to the certain disk is complete.

14. A system as claimed in claim 12 wherein:
the third disk responds to the data access requests for the first segment of the second disk without forwarding them to the second disk.

15. A system as claimed in claim 9 wherein:
the third disk stops acting as the primary disk for data accesses to the mirror of the first segment of the second disk after the regeneration is complete.

16. A system as claimed in claim 9, wherein the means for regenerating regenerates data on the certain disk in case of failure of a processing unit, and regenerates data on a spare disk in case of a disk failure.

* * * * *